（12）United States Patent
Rapier et al.

(10) Patent No.: US 7,381,230 B2
(45) Date of Patent: Jun. 3, 2008

(54) REACTOR AND PROCESS FOR MAKING SYNTHESIS GAS

(75) Inventors: C. Robert Rapier, Billings, MT (US); James A. McMahon, Blackwell, OK (US)

(73) Assignee: ConocoPhillips Company, Houston, TX (US)

( * ) Notice: Subject to any disclaimer, the term of this patent is extended or adjusted under 35 U.S.C. 154(b) by 531 days.

(21) Appl. No.: 11/026,480

(22) Filed: Dec. 30, 2004

(65) Prior Publication Data
US 2006/0143980 A1   Jul. 6, 2006

(51) Int. Cl.
*B01J 7/00* (2006.01)
*B01J 8/04* (2006.01)
*C01B 3/02* (2006.01)
*C01B 3/26* (2006.01)
*C10G 51/02* (2006.01)

(52) U.S. Cl. .................. 48/61; 422/188; 422/189; 422/190; 422/191; 422/192; 422/193; 422/194; 422/195; 208/49; 423/648.1; 423/651

(58) Field of Classification Search ........ 422/188–195; 423/648.1, 651; 48/61; 208/49
See application file for complete search history.

(56) References Cited

U.S. PATENT DOCUMENTS

| | | | |
|---|---|---|---|
| 4,264,435 A * | 4/1981 | Read et al. | 208/129 |
| 5,998,687 A * | 12/1999 | Woodle et al. | 585/449 |
| 6,299,759 B1 * | 10/2001 | Bradway et al. | 208/59 |
| 6,365,544 B2 | 4/2002 | Herron et al. | |
| 6,395,944 B1 | 5/2002 | Griffiths et al. | |
| 6,402,989 B1 | 6/2002 | Gaffney | |
| 6,409,940 B1 | 6/2002 | Gaffney et al. | |
| 6,433,234 B1 | 8/2002 | Griffiths et al. | |
| 6,461,539 B1 | 10/2002 | Gaffney | |

(Continued)

FOREIGN PATENT DOCUMENTS

| | | |
|---|---|---|
| EP | 1160193 A1 | 5/2001 |
| WO | WO99/35082 | 7/1999 |

OTHER PUBLICATIONS

G.E. Voecks, *Unconventional Utilization of Monolithic Catalysts for Gas-Phase Reactions* and J.A. Moulijn, Structured Catalysts and Reactors edited by A. Cybulski (1998) Ch. 7, pp. 179-208.

X. Xu et al., *Transformation of Structured Carrier into Structured Catalyst*, Structured Catalysts and Reactors edited by A. Cybulski et al. (1998), Ch. 21, pp. 599-615.

(Continued)

*Primary Examiner*—Walter D. Griffin
*Assistant Examiner*—Huy-Tram Nguyen

(57) ABSTRACT

The invention relates to reactor systems and processes for producing synthesis gas. In one embodiment, a reactor comprises a first reaction zone comprising a combustion catalyst, wherein the first reaction zone is operated at conditions sufficient to produce a combustion zone product comprising heat generated by the combustion of a fuel. The reactor further comprises a second reaction zone comprising a partial oxidation catalyst, wherein the second reaction zone is adapted to receive the combustion zone product and a reaction feed comprising a hydrocarbon gas. The second reaction zone is operated at conditions sufficient for partially oxidizing the hydrocarbon gas to a product stream comprising synthesis gas. The heat of combustion is transferred directly to the reaction feed by mixing it in a feed mix region located in the reactor between the first and second reaction zones, in such a manner that the reaction feed does not need preheating prior to entering the partial oxidation zone.

64 Claims, 3 Drawing Sheets

U.S. PATENT DOCUMENTS

| | | | |
|---|---|---|---|
| 6,488,907 | B1 | 12/2002 | Barnes et al. |
| 6,630,078 | B2 | 10/2003 | Kourtakis et al. |
| 6,635,191 | B2 | 10/2003 | Figueroa |
| 7,074,977 | B2 * | 7/2006 | Rapier et al. ............... 585/324 |
| 7,208,136 | B2 * | 4/2007 | Holladay et al. ........... 423/652 |
| 7,220,392 | B2 * | 5/2007 | Rong et al. ................. 422/201 |
| 2002/0002794 | A1 * | 1/2002 | Figueroa et al. .......... 48/197 R |
| 2002/0115730 | A1 | 8/2002 | Allison et al. |
| 2002/0134706 | A1 | 9/2002 | Keller et al. |
| 2004/0062956 | A1 * | 4/2004 | Goebel et al. ................ 429/13 |
| 2004/0138060 | A1 | 7/2004 | Rapier et al. |
| 2004/0154222 | A1 * | 8/2004 | Burch et al. ............... 48/127.9 |
| 2004/0159046 | A1 * | 8/2004 | Komaki et al. ............ 48/127.9 |
| 2005/0013752 | A1 * | 1/2005 | Fujii et al. .................. 422/188 |
| 2005/0124841 | A1 | 6/2005 | Rapier et al. |

OTHER PUBLICATIONS

G. Veser et al., *Ignition in Alkane Oxidation on Noble-Metal Catalysts*, Elsevier Science, Catalyst Today (1999), vol. 47, No. 1-4, pp. 219-228.

G. Veser et al., *Ignition and Extinction In the Catalytic Oxidation of Hydrocarbons over Platinum*, AlChE Journal (Apr. 1996) vol. 42, No. 4, pp. 1077-1087.

B. Xianjun et al., *Microwave effect on partial oxidation of methane to syngas over Co/La2O3*, Chinese Journal of Chemical Physics (Jun. 1998) vol. 11, No. 3, pp. 193-196.

J.M. Redenius (L.D. Schmidt, Adviser), *Heat Integration in Millisecond Catalytic Reactors*, Ph.D. Thesis to UMI, UMI No. 3014864 (Jul. 2001), pp. 1-169.

* cited by examiner

REACTOR AND PROCESS FOR MAKING SYNTHESIS GAS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention relates to the field of gas conversion and more specifically to the field of synthesis gas production.

2. Background of the Invention

Natural gas, found in deposits in the earth, is an abundant energy resource. For example, natural gas commonly serves as a fuel for heating, cooking, and power generation, among other things. The process of obtaining natural gas from an earth formation typically includes drilling a well into the formation. Wells that provide natural gas are often remote from locations with a demand for the consumption of the natural gas.

Thus, natural gas is conventionally transported large distances from the wellhead to commercial destinations in pipelines. This transportation presents technological challenges due in part to the large volume occupied by a gas. Because the volume of a gas is so much greater than the volume of a liquid containing the same number of gas molecules, the process of transporting natural gas typically includes chilling and/or pressurizing the natural gas in order to liquefy it. However, this contributes to the final cost of the natural gas.

Further, naturally occurring sources of crude oil used for liquid fuels such as gasoline and middle distillates have been decreasing, and supplies are not expected to meet demand in the coming years. Middle distillates typically include heating oil, jet fuel, diesel fuel, and kerosene. Fuels that are liquid under standard atmospheric conditions have the advantage that in addition to their value, they can be transported more easily in a pipeline than natural gas, since they do not require the energy, equipment, and expense required for liquefaction.

Thus, for all of the above-described reasons, there has been interest in developing technologies for converting natural gas to more readily transportable liquid fuels, i.e. to fuels that are liquid at standard temperatures and pressures. One method for converting natural gas to liquid fuels involves two sequential chemical transformations. In the first transformation, natural gas or methane, the major chemical component of natural gas, is reacted with oxygen and/or steam to form synthesis gas (or syngas), which is a combination of carbon monoxide and hydrogen. In the second transformation, which is known as Fischer-Tropsch synthesis, carbon monoxide is reacted with hydrogen to form organic molecules containing mainly carbon and hydrogen. Those organic molecules containing carbon and hydrogen are known as hydrocarbons. In addition, other organic molecules containing oxygen in addition to carbon and hydrogen, which are known as oxygenates, can also be formed during the Fischer-Tropsch synthesis. Hydrocarbons comprising carbons having no ring formation are known as aliphatic hydrocarbons and are particularly desirable as the basis of synthetic diesel fuel.

In the first transformation, the natural gas is typically partially oxidized to form the syngas. Catalytic partial oxidation processes typically include a feedstock that is preheated and mixed with an oxygen source, such as air, oxygen-enriched air, or oxygen, and introduced to a catalyst at elevated temperature and pressure. In order to initiate a catalytic partial oxidation process, the feed may be preheated upstream of the catalyst bed. However, a drawback to this practice is an increased safety hazard as the feed may have an increased chance of auto-ignition. As the pressure increases, the risk of auto-ignition may increase. Such preheating of the feed may also increase the cost of a syngas production unit. A pressure increase may be safely accomplished by reducing the preheat but may negatively affect the performance of the syngas reactor.

Consequently, there is a need for a syngas reactor that has a reduced use of pre-heated feed. In addition, there is a need for a more efficient process of producing syngas. Other needs include reducing the cost and increasing the performance of a syngas reactor.

BRIEF SUMMARY OF SOME OF THE PREFERRED EMBODIMENTS

These and other needs in the art are addressed in one embodiment by a reactor for producing synthesis gas from a feedstream comprising a hydrocarbon-containing gas and an oxygen-containing gas.

One embodiment of the present invention relates to a reactor comprising two reaction zones in fluid and thermal communication, wherein one of the reaction zones generates heat while the other reaction zone generates synthesis gas. The reactor comprises a first reaction zone comprising a combustion catalyst, wherein the first reaction zone is operated at conditions sufficient to produce a combustion effluent comprising heat generated by the combustion of a fuel. In addition, the reactor comprises a first feed inlet, wherein the first feed inlet is suitable for introducing a combustion zone feed comprising the fuel to the first reaction zone. The reactor further comprises a second reaction zone comprising a syngas catalyst, wherein the second reaction zone is operated at conditions sufficient for partially oxidizing the hydrocarbon-containing gas to a product stream comprising synthesis gas. The reactor further comprises a second feed inlet, wherein the second feed inlet is suitable for introducing a reaction feed to the reactor, and an inter-bed zone located between the first reaction zone and the second reaction zone, and adapted to receive the combustion effluent and the reaction feed, wherein the inter-bed zone comprises a feed mix region, and further wherein the feed mix region allows for sufficient mixing of the combustion effluent with the reaction feed.

Another embodiment includes a process for the production of synthesis gas from a feedstream comprising a hydrocarbon gas and oxygen. The process comprises providing a reactor system comprising a first reaction zone, a second reaction zone being in fluid communication with said first reaction zone, and an inter-bed zone disposed between the first and second catalytic zones, wherein the first reaction zone is catalytic and comprises a combustion catalyst and the second reaction zone is catalytic and comprises a partial oxidation catalyst. In addition, the process comprises feeding a combustion feed comprising oxygen and a fuel to the first reaction zone, wherein the combustion feed is at super atmospheric pressure, and contacting the combustion feed with the combustion catalyst under conditions sufficient to combust at least a portion of the fuel so as to form a combustion effluent. The process further comprises feeding a reaction feed comprising a hydrocarbon gas and oxygen to the inter-bed zone, wherein the reaction feed is at super atmospheric pressure and mixing the combustion effluent and the reaction feed in at least a region of the inter-bed zone to form a syngas feed comprising the combustion effluent, the hydrocarbon gas and oxygen. Moreover, the process comprises feeding the syngas feed to the second reaction zone, and contacting the syngas feed to the syngas catalyst at conditions sufficient to partially oxidize the hydrocarbon gas to generate a product stream comprising hydrogen and carbon monoxide.

A further embodiment includes a process for the production of synthesis gas from a feedstream comprising a hydrocarbon-containing gas and an oxygen-containing gas. The process further comprises providing a reactor system comprising a shell that is housing an outer chamber, a first reaction zone, a second reaction zone, and an inter-bed zone, wherein the inter-bed zone is disposed between said first and second reaction zones, and further wherein the outer chamber envelops at least a portion of the inter-bed zone. In addition, the process comprises feeding a combustion feed to the first reaction zone comprising a combustion catalyst, wherein the combustion feed comprises oxygen and a fuel, and contacting the combustion feed with the combustion catalyst under conditions sufficient to combust at least a portion of the fuel so as to form a combustion effluent which exits the first reaction zone. The process further comprises feeding a reaction feed comprising a hydrocarbon gas and oxygen to the outer chamber, wherein the reaction feed is further passed from the outer chamber to the inter-bed zone and mixing the combustion effluent and the reaction feed downstream of the first reaction zone in a feed mix region of the inter-bed zone to form a syngas feed comprising the combustion effluent, oxygen, and the hydrocarbon gas. Moreover, the process comprises feeding the syngas feed to the second reaction zone comprising a partial oxidation catalyst and contacting the syngas feed with the partial oxidation catalyst at conditions sufficient to partially oxidize the hydrocarbon gas to a product stream comprising hydrogen and carbon monoxide.

Additional embodiments include not pre-heating the feed to the first reaction zone or combustion zone. Further embodiments include the reaction feed being fed to the reactor upstream of the feed mix region.

The Applicants have identified that a higher temperature feedstream (typically comprising a gaseous hydrocarbon and molecular oxygen) to a catalytic partial oxidation (CPOX) reaction zone disposed in the reactor will result in improved economics for a CPOX-based synthesis gas process due to the improved performance of the CPOX reaction zone. However, increasing the temperature of the feedstream by means of ex-situ preheating, as it is generally done before the feedstream enters the reactor, may result in having such a combustible gas close to auto-ignition conditions well before the feedstream reaches the CPOX reaction zone. Thus, the reactor of the present invention is designed to heat in situ the feedstream in very close proximity to the CPOX reaction zone disposed in said reactor. Since the heating of the feedstream is done in situ before the feedstream enters the CPOX reaction zone, it is not necessary to preheat ex-situ the feedstream before its entry into the reactor by the use of a pre-heater (such as a fired heater or furnace). While not wishing to be bound by a particular theory, it is believed that the lack of ex-situ preheating of the feedstream to a CPOX reactor should reduce the risk of pre-ignition of the feedstream before it is fed to the reactor containing the CPOX reaction zone. Upon further optimization of this reactor system and syngas gas production process, the pressure of the feedstream fed to said reactor can be increased well above atmospheric pressure to further improve the economics of a commercial CPOX process.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1B:
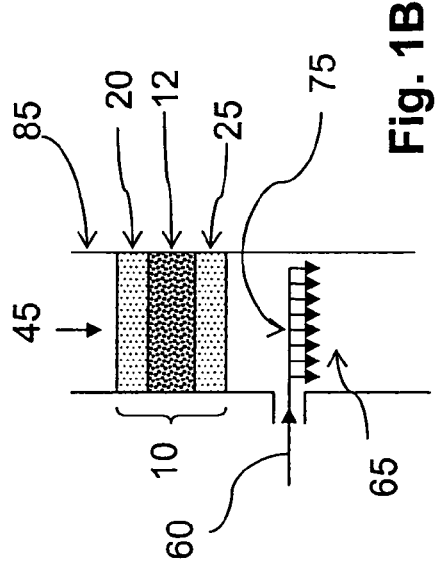
FIGS. 1A, 1B and 1C illustrate several embodiments of a syngas reactor comprising two reaction zones with each zone comprising a catalyst.
Figure 1C:
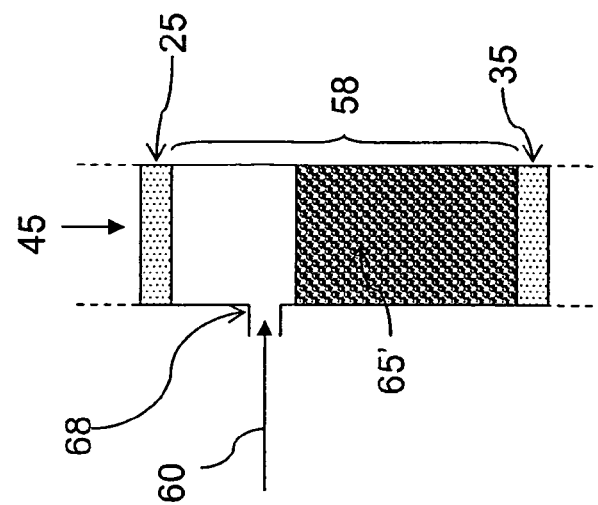
Figure 1A:
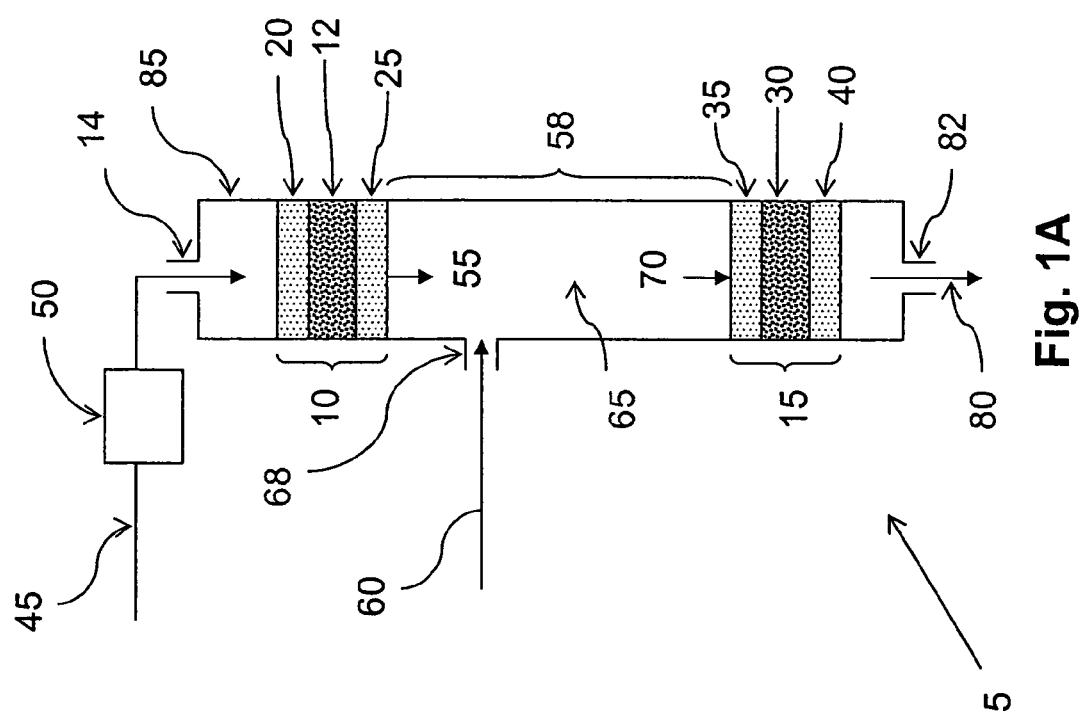

FIG. 1A illustrates a reactor 5 comprising a combustion zone 10 and a syngas production zone 15. Reactor 5 can comprise a short contact time reactor (SCTR), a catalytic fixed bed reactor, and a tube-shell reactor. Preferably, reactor 5 comprises a SCTR. Syngas production zone 15 is adapted to receive at least a portion of an effluent exiting combustion zone 10.

In preferred embodiments, reactor 5 comprises a single shell 85 that houses combustion zone 10 and syngas production zone 15. In such embodiments, combustion zone 10 and syngas production zone 15 operate at about the same pressure. Combustion zone 10 and syngas production zone 15 both preferably comprise an exothermic reaction.

Combustion zone 10 comprises a combustion catalyst bed 12. Combustion catalyst bed 12 comprises a catalyst that is active in the combustion of a fuel. The fuel is fed to the combustion zone 10 via combustion feed 45. In some embodiments, combustion feed 45 comprises $O_2$, steam and a carbonaceous fuel. The steam-to-carbon molar ratio ($H_2O$:C) of combustion feed 45 may be between about 0 and about 1:1, preferably between about 0.01:1 and about 0.5:1. In some embodiments, the $H_2O$:C molar ratio of combustion feed 45 is less than about 0.2:1. In other embodiments, combustion feed 45 is substantially free of steam or water (i.e., less than 500 ppm). In some embodiments, no water or steam is added to combustion feed 45.

The combustion catalyst in combustion catalyst bed 12 comprises any suitable metal that exhibits catalytic activity in the combustion of alkanes. The combustion catalyst may include one or more catalytic components selected from the group consisting of copper, manganese, iron, cobalt, nickel, tin, samarium, lanthanum, cerium, chromium, any oxide thereof, platinum, palladium, rhodium, ruthenium, iridium, osmium, bismuth, titanium, and any combination of two or more thereof. The combustion catalyst preferably includes one catalytic component selected from the group consisting of chromium, cerium, lanthanum, samarium, cobalt, any oxide thereof, platinum, palladium, rhodium, ruthenium, iridium, osmium, and any combination of two or more thereof. More preferably, the catalytic component in the combustion catalyst comprises platinum, palladium, chromium, or any combination of two or more thereof. In some embodiments, the combustion catalyst in combustion catalyst bed 12 comprises a noble metal selected from the group consisting of platinum, palladium, rhodium, ruthenium, iridium, osmium, and any combination of two or more thereof; and a second component such as a transition metal or metal oxide, a lanthanide metal or oxide thereof, or combinations thereof. A suitable transition metal or lanthanide metal is preferably selected from the group consisting of copper, manganese, iron, cobalt, nickel, tin, samarium, lanthanum, cerium, chromium, and any oxide thereof.

The combustion catalyst can comprise any suitable catalytic component concentration from about 0.001 to about 10 percent by weight of the catalyst. When the combustion catalyst comprises palladium as the catalytic component, the catalyst has a palladium content preferably from about 0.001 percent to about 1 percent by weight of the catalyst, and more preferably from about 0.05 percent to about 0.2 percent by weight of the catalyst. When the combustion catalyst comprises platinum as the catalytic component, the catalyst has a platinum content preferably from about 0.01 percent to about 8 percent by weight of the catalyst, and more preferably from about 0.5 percent to about 7 percent by weight of the catalyst. When the combustion catalyst comprises chromium as the catalytic component, the catalyst has a chromium content preferably from about 0.01 percent to about 8 percent by weight of the catalyst, more preferably from about 0.1 percent to about 5 percent by weight of the catalyst, and still more preferably from about 0.5 percent to about 3 percent by weight of the catalyst. Weight percent (wt. %) refers to the weight of the catalytic component relative to the total weight of the catalyst (i.e., support, catalytic component(s) and any optional promoter).

In addition, the combustion catalyst may further comprise a support. Catalyst supports are well known in the art, and the combustion catalyst may comprise any suitable support for use in combustion zone 10. Without limiting the scope of the invention, the support used in the combustion catalyst can include a support comprising any refractory material such as any inorganic oxide that is stable at the operating temperature and pressure of combustion zone 10. A "refractory material" refers to any material that is mechanically stable to the high temperatures of a catalytic partial oxidation reaction, which is typically 500° C.-1,600° C., but may be as high as 2,000° C. Suitable refractory materials for catalyst support include titania, silica, zirconia, magnesium stabilized zirconia, zirconia stabilized alumina, yttrium stabilized zirconia, calcium stabilized zirconia, alumina, magnesia, niobia, vanadia or other inorganic oxides, cordierite, zinc oxide, phosphates (such as aluminum phosphates or silica alumina phosphates), or mixtures thereof. The refractory material may be modified, promoted, stabilized or doped, or may be an unpromoted, unmodified or undoped material. In an embodiment, the preparation of the catalyst support may include a stabilization step. Stabilizing may include thermally conditioning the catalyst and/or adding a catalyst modifier, and may generally result in stabilizing the support internal surface area. For example, a refractory material such as alumina or zirconia may be modified by a catalyst modifier selected from a group consisting of a Group 2 element (such as Mg and Ba); a Group 3 element including zirconium, titanium, silicon, a rare earth metal (such as Y, La, Pr, Nd, Pm, Sm, Yb and any combination thereof); any oxide thereof; and combinations thereof. In preferred embodiments, the support particles are characterized by a longest dimension of from about 0.8 mm to about 10 mm.

The support of the combustion catalyst in combustion bed 12 can be in any shape suitable for operation at the desired gas velocities with minimal back pressure. Such shapes can include foam, monolith, gauze, mat, wire, noodles, spheres, pills, particulates or the like. Preferred shapes for the support material include refractory monolith or a plurality of distinct or discrete structures or particulates. The terms "distinct" or "discrete" structures, as used herein, refer to supports in the form of divided materials such as granules, beads, pills, pellets, cylinders, trilobes, extrudates, spheres or other rounded shapes, or another manufactured configuration. Alternatively, the divided material may be in the form of irregularly shaped particles. Preferably at least a majority (i.e., >50%) of the particles or distinct structures of the combustion catalyst have a maximum characteristic length (i.e., longest dimension) of less than six millimeters, preferably less than three millimeters. The term "monolith" as used herein is any singular piece of material of continuous manufacture such as solid pieces of refractory material, metal or metal oxide, or foam materials or honeycomb structures. In some embodiments, two or more catalyst monoliths are stacked in the combustion zone 10. A combustion catalyst combination may comprise separate and distinct catalyst structures (each of which has particular catalytic properties) or may be a single catalyst structure comprising two or more catalytic components on a support. In preferred embodiments, the support comprises particles characterized by a longest dimension from about 1 mm to about 8 mm. In alternate embodiments, the particles have a longest dimension from about 2 mm to about 8 mm. In alternate embodiments, the support comprises particles characterized by a longest dimension from about 0.8 mm to about 15 mm; preferably from about 1 mm to about 10 mm; more preferably from about 3 mm to about 8 mm. In some embodiments, support particles comprise alpha-alumina or corundum. In some embodiments, the support is in the shape of particles comprising alumina or zirconia.

Combustion catalyst bed 12 comprising the combustion catalyst has sufficient porosity, or sufficiently low resistance to gas flow, to permit a reactant gas mixture comprising at least a fuel and oxygen (i.e., combustion feed 45) to pass over or through the combustion catalyst in combustion catalyst bed 12 at a gas hourly space velocity (GHSV) of at least about 10,000 $hr^{-1}$, when combustion catalyst bed 12 is operated to generate heat and combustion products, such as $CO_2$ and/or $H_2O$ (i.e., $H_2O$ is the combustion product of hydrogen serving as the fuel; $CO_2$ is the combustion product of CO serving as the fuel; and $H_2O$ and $CO_2$ are combustion products of a hydrocarbonaceous compound serving as the fuel). The gas hourly space velocity (GHSV) in combustion catalyst bed 12 may be greater than about 20,000 $hr^{-1}$. Since the combustion products comprise $CO_2$ and/or $H_2O$, and there is no subsequent conversion of combustion products within combustion catalyst bed 12, a low GHSV, i.e., below about 20,000 hr$^{-1}$, (resulting in a higher contact time with the combustion catalyst) in combustion zone 10 may be suitable and may generate the necessary heat. Since the combustion reaction is complete at higher space velocities, a lower gas space velocity in combustion bed 12 may not use as effectively the combustion catalyst as a higher gas space velocity would. In some embodiments, the gas hourly space velocity (GHSV) in combustion catalyst bed 12 is about 1,000,000 hr$^{-1}$ or less. In alternate embodiments, the gas hourly space velocity (GHSV) in combustion catalyst bed 12 may be between about 10,000 hr$^{-1}$ and about 1,000,000 hr$^{-1}$. In yet other embodiments, the gas hourly space velocity (GHSV) in combustion catalyst bed 12 may be between about 25,000 hr$^{-1}$ and about 500,000 hr$^{-1}$. In preferred embodiments, the gas hourly space velocity (GHSV) in combustion zone 12 may be between about 50,000 hr$^{-1}$ and about 200,000 hr$^{-1}$. In more preferred embodiments, the gas hourly space velocity (GHSV) in combustion catalyst bed 12 may be between about 50,000 hr$^{-1}$ and about 100,000 hr$^{-1}$. In alternate embodiments, combustion feed 45 passes over or through the combustion catalyst in combustion catalyst bed 12 at a weight hourly space velocity (WHSV) greater than about 100 hr$^1$. In other embodiments, the WHSV in bed 12 is greater than about 200 hr$^{-1}$. In some embodiments, the pressure in catalyst bed 12 can be from about from about 2 atm to about 40 atm (about 200-4,050 kPa), preferably from about 4 atm to about 40 atm (about 400-4,050 kPa), more preferably from about 7 atm to about 35 atm (about 700-3,550 kPa).

Combustion catalyst bed 12 can be diluted with a non-catalytic packing material, such as an inert refractory material. Any acceptable inert refractory material can be used. For instance, inert refractory materials can include alumina, silicon carbide, zirconia, magnesium oxide, and the like. The non-catalytic packing material may be in the form of discrete structures or particulates (such as particles, pellets, trilobes, and the like) that may be mixed with, or sandwiched between layers of, a particulate catalytic material to form combustion catalyst bed 12. A non-catalytic packing material can provide a diluent for combustion catalyst bed 12 comprising particulate catalytic material. The non-catalytic packing material may provide enhanced heat transfer throughout combustion catalyst bed 12. For example, one might select a composition for the non-catalytic packing material with a high thermal conductivity (i.e., greater than 40 W/mK at 25° C.). For example, a material with a high thermal conductivity material and excellent thermal shock resistance to high temperatures (such as greater than 700° C.) may be used as the non-catalytic packing material or a portion of the non-catalytic packing material to dissipate at least some of the heat formed by the catalytic exothermic reaction in combustion catalyst bed 12, so as to minimize hot spots formation within combustion catalyst bed 12 and facilitate removal of produced heat. The weight ratio of non-catalytic packing material to catalytic material may vary from about 1:5 to about 30:1. Alternatively, the weight ratio of non-catalytic packing material to catalytic material may vary from about 1:3 to about 20:1. In other embodiments, the weight ratio of non-catalytic packing material to catalytic material may vary from 1:1 to 10:1. In some embodiments, combustion catalyst bed 12 may not be diluted by a non-catalytic packing material. In some embodiments, combustion catalyst bed 12 consists essentially of a catalytic material.

In preferred embodiments, combustion zone 10 further comprises a combustion shield 20 and a combustion floor 25. Combustion shield 20 can comprise any suitable shield for reducing energy loss and/or preventing combustion feed 45 from igniting upstream of the combustion catalyst bed 12. Combustion shield 20 may also aid in uniform distribution of the combustion feed 45. Combustion shield 20 can comprise any suitable material such as a porous refractory material, preferably alumina ($Al_2O_3$), more preferably alumina foam. Combustion floor 25 can comprise any suitable floor for supporting combustion catalyst bed 12 and combustion shield 20. Combustion floor 25 can comprise any suitable material, such as a porous refractory material, preferably alumina, more preferably alumina foam. In an embodiment, combustion shield 20 and floor 25 comprise one or more ceramic foams. Ceramic foams may comprise alpha-alumina or zirconia. In some embodiments, one or more ceramic foam pieces comprising 90 wt. % or more $Al_2O_3$ can be used as combustion floor 25 and shield 20. In alternate embodiments, combustion floor 25 and shield 20 comprise or consist essentially of one or more ceramic foam pieces comprising 95 wt. % or more $Al_2O_3$. In preferred embodiments, combustion floor 25 and shield 20 comprise one or more ceramic foam pieces, said ceramic foam pieces comprising a pore density between about 10 pores per inch (ppi) and about 100 ppi, preferably between about 10 pores per inch (ppi) and about 60 ppi, more preferably between about 10 pores per inch (ppi) and about 45 ppi.

Combustion zone 10 does not contain a burner to ignite combustion feed 45. Additionally, the portion of reactor 5 upstream of combustion zone 10 does not contain a burner to facilitate ignition of combustion feed 45.

Syngas production zone 15 comprises a syngas catalyst bed 30. In preferred embodiments, the syngas catalyst bed 30 comprises suitable conversion conditions to promote an exothermic reaction to product synthesis gas or syngas (i.e., mixture of $H_2$ and CO). In more preferred embodiments, syngas catalyst bed 30 comprises a catalyst that is active for producing synthesis gas. Most preferably, the catalyst in syngas catalyst bed 30 promotes the partial oxidation reaction of a hydrocarbon gas to form synthesis gas.

The catalyst in syngas catalyst bed 30 may comprise any acceptable syngas catalyst, such as a syngas catalyst comprising a catalytic component selected from the group consisting of rhenium; at least a Group VIII metal (such as nickel, cobalt, ruthenium, palladium, osmium, iridium, platinum, rhodium); any combination or alloy of nickel and magnesium oxide (Ni—MgO); mixed inorganic oxides (e.g., perovskites) containing at least a Group VIII metal; any combination or alloy of Ni and Rh (Ni—Rh); and any combination of two or more thereof. In preferred embodiments, the syngas catalyst comprises a catalytic component selected from the group consisting of rhenium, nickel, cobalt, ruthenium, palladium, osmium, iridium, platinum, rhodium, any combination or alloy of nickel and magnesium oxide (Ni—MgO), any combination or alloy of Ni and Rh (Ni—Rh), and any combination of two or more thereof, more preferably rhodium.

In some embodiments, the syngas catalyst in bed 30 comprises a bulk catalytic component, such as foam, wire, gauze, and the like. In preferred embodiments, the syngas catalyst comprises a support. The catalytic component is generally deposited on the catalyst support. The catalyst support may comprise any suitable shape or structure, such as, for example, pellets, pills, foams, monoliths, beads, particulates, granules, rings, ceramic honeycomb structures, wire gauze or any other suitable supports in any acceptable shape. In some embodiments, the support comprises a refractory material, and hence the catalyst in syngas catalyst bed 30 comprises a refractory support. Suitable refractory materials for catalyst support include titania, silica, zirconia, magnesium stabilized zirconia, zirconia stabilized alumina, yttrium stabilized zirconia, calcium stabilized zirconia, alumina, magnesia, niobia, vanadia or other inorganic oxides, cordierite, zinc oxide, phosphates (such as aluminum phosphates or silica alumina phosphates), or mixtures thereof. The refractory material may be modified, promoted, stabilized or doped, or may be an unpromoted, unmodified or undoped material. In an embodiment, the preparation of the catalyst support may include a stabilization step. Stabilizing may include thermally conditioning the catalyst and/or adding a catalyst modifier, and may generally result in stabilizing the support internal surface area, as is described for the combustion catalyst in combustion catalyst bed 12. In preferred embodiments, the support is in the shape of particles. In some embodiments, the support particles are characterized by a longest dimension from about 0.8 mm to about 10 mm. In more preferred embodiments, the particles have a longest dimension from about 1 mm to about 8 mm. In alternate embodiments, the particles have a longest dimension from about 2 mm to about 10 mm. In other alternate embodiments, the support comprises particles characterized by a longest dimension from about 0.8 mm to about 15 mm; preferably from about 1 mm to about 10 mm. In some embodiments, support particles comprise alumina, zirconia, or a rare-earth aluminate. In some embodiment, support particles comprise alpha-alumina or corrundum. In alternate embodiments, particles consist essentially of alpha-alumina. In other embodiments, the support comprises alpha-alumina and at least one rare-earth aluminate. It is also envisioned that it is not always necessary that the catalyst be supported. For example, an unsupported catalyst may be in the form of wire gauze, wire mesh, metal shot, metal foam, or a metal monolith.

There are a plethora of catalyst systems that would be acceptable for catalyst bed 30 and are contemplated to fall within the scope of the present invention, such as those disclosed in STRUCTURED CATALYSTS AND REACTORS, 179-208, 599-615 (Andrzej Cybulski and Jacob A. Moulijn eds. 1998.

In preferred embodiments, syngas catalyst bed 30 comprises a partial oxidation catalyst. Suitable examples of catalysts and reaction conditions for partial oxidation systems to be employed in syngas catalyst bed 30 to form hydrogen and CO from catalytic partial oxidation of a hydrocarbon gas comprising methane are disclosed in U.S. Patent Publications No. 2002/0115730 to Allison et al. and 2004/0138060 to Rapier et al.; and in U.S. Pat. Nos. 6,402,989; 6,409,940; 6,461,539; 6,630,078; and 6,635,191; each of which is incorporated herein by reference in its entirety. Preferred examples of partial oxidation catalysts comprise rhodium, nickel, palladium, platinum, ruthenium, iridium, or combinations of two or more thereof. The more preferred examples of partial oxidation catalysts comprise rhodium and a lanthanide promoter, such as samarium, lanthanum, ytterbium, praseodymium, neodymium, neodymium, or any combination of two or more thereof. The partial oxidation catalyst in syngas catalyst bed 30 is preferably supported, wherein the support is preferably shaped in the form of discrete structures such as particles. The support of the partial oxidation catalyst in syngas catalyst bed 30 preferably comprises alpha-alumina, at least one rare-earth aluminate, or combinations thereof.

Syngas production zone 15 preferably comprises a shield 35 and a floor 40. Shield 35 can comprise any suitable shield for reducing energy loss and/or preventing the reaction from backing up the feed. Shield 35 may also facilitate distribution of feed gas. Shield 35 can comprise any suitable material such as a porous refractory material, preferably alumina, more preferably alumina foam. Floor 40 can comprise any suitable floor for supporting syngas catalyst bed 30 and shield 35. Floor 40 can comprise any suitable material such as a porous refractory material, preferably alumina, more preferably alumina foam. Shield 35 and floor 40 comprise one or more ceramic foams. Ceramic foams may comprise alpha-alumina or zirconia. In some embodiments, one or more ceramic foam pieces comprising 90 wt. % or more $Al_2O_3$ can be used as floor 40 and shield 35. In some embodiments, floor 40 and shield 35 comprise ceramic foam pieces, said ceramic foam piece comprising a pore density between about 10 pores per inch (ppi) and about 60 ppi, preferably between about 10 pores per inch (ppi) and about 45 ppi.

Syngas production zone 15 does not contain a burner or flame to ignite the gas (i.e., syngas feed 70) feeding syngas catalyst bed 30.

The following describes an exemplary application of the present invention as described in FIG. 1A. Combustion feed 45 is fed to combustion zone 10 and contacted with the combustion catalyst in combustion catalyst bed 12. A combustion effluent 55 exits combustion zone 10. Reactor 5 has at least one inlet 14 suitable for introducing combustion feed 45 to combustion zone 10. Combustion feed 45 is a gas stream comprising an oxygen-containing gas (i.e., $O_2$-containing gas) and a fuel. The $O_2$-containing gas and the fuel are preferably premixed to form combustion feed 45 prior to entering combustion zone 10. In alternate embodiments, feeding combustion feed 45 to reactor 5 may comprise feeding separately an $O_2$-containing feedstock and a fuel feedstock via different inlets (not illustrated), so that the $O_2$-containing feedstock and the fuel feedstock could be mixed after entering reactor 5 in a zone (not illustrated) between different inlets and upstream end of zone 10. In some embodiments, the fuel comprises a gaseous compound or mixtures of gaseous compounds, such as a gaseous hydrocarbon, hydrogen gas ($H_2$), carbon monoxide (CO) or mixtures thereof. In other embodiments, the fuel comprises a vaporized liquid, such as one or more vaporized alcohols (such as ethanol, methanol and the like), one or more vaporized hydrocarbons such as any hydrocarbon with more than 5 carbon atoms, liquid petroleum gas, or mixtures thereof. In preferred embodiments, the fuel comprises a gaseous hydrocarbon (such as alkane, alkene, alkyne), hydrogen gas, synthesis gas, or mixtures thereof. In alternate embodiments, the fuel comprises a one or more gaseous compounds and one or more vaporized liquids. The fuel can include methane, carbon monoxide, hydrogen, any gaseous hydrocarbon (e.g., ethane, propane, and the like), or mixtures thereof. The fuel can include carbon monoxide and hydrogen in any ratio, which includes ratios from pure hydrogen to pure carbon monoxide and any ratios between. Without limitation, examples of suitable oxygen-containing gases include substantially pure oxygen ($O_2$); air; $O_2$-enriched air; $O_2$ diluted with a non-reactive gas such as nitrogen; any $O_2$-rich recycle stream or effluent stream from another unit, which may comprise a significant $O_2$ content (i.e., greater than 60 mol % of $O_2$), and which may have been sent through a separation unit in order to increase its $O_2$ content. Combustion feed 45 can have any fuel-to-oxygen ratio suitable for combustion of the fuel. For example, combustion feed 45 can have a fuel-to-$O_2$ molar ratio between about 1:2 and about 10:1. Another embodiment may have a fuel-to-$O_2$ molar ratio between about 1:2 and about 5:1. An alternate embodiment may have a combustion feed 45 with a fuel-to-$O_2$ molar ratio between about 1:2 and about 2:1. An additional embodiment may have a combustion feed 45 with a fuel-to-$O_2$ molar ratio between about 2:1 and about 5:1. In preferred embodiment, the fuel-to-$O_2$ molar ratio of combustion feed 45 is equal to or greater than the fuel-to-$O_2$ stoichiometric ratio for the combustion of said fuel. In some preferred embodiments, combustion feed 45 has a fuel-to-$O_2$ molar ratio greater than the stoichiometric molar ratio (i.e., combustion feed 45 is lean in $O_2$ and rich in fuel) so that the oxygen conversion will be substantially complete and the combustion effluent 55 exiting combustion zone 10 comprises less than about 1,000 ppm $O_2$, preferably less than about 500 ppm $O_2$, more preferably less than about 100 ppm $O_2$. It is to be understood that the stoichiometric fuel-to-$O_2$ molar ratio can be varied depending on the composition of the fuel. For instance, when the fuel comprises methane, the stoichiometric methane-to-oxygen (i.e., $CH_4:O_2$) molar ratio is 1:2, which may result in complete combustion of the methane to $CO_2$ and $H_2O$ (i.e., $CH_4 + 2 O_2 \rightarrow CO_2 + 2H_2O + Heat$). In other instances, when the fuel comprises hydrogen, the stoichiometric hydrogen-to-oxygen (i.e., $H_2:O_2$) molar ratio is 2:1, which may result in complete combustion of the hydrogen to $H_2O$ (i.e., $H_2 + 0.5 O_2 \rightarrow H_2O + Heat$).

Combustion feed 45 is preferably gaseous prior to entering combustion zone 10. In some embodiments, combustion feed 45 may comprise one or more vaporized organic compounds that would be in liquid form at ambient temperature and pressure, such as for example an alcohol (methanol, ethanol, propanol, phenol) or a glycol-containing compound. Combustion feed 45 may be preheated prior to being fed to combustion zone 10 or may be fed at ambient temperature. The preheating of combustion feed 45 may be accomplished to initiate the combustion reaction in zone 10 and/or to vaporize a liquid component of combustion feed 45. The preheat temperature may vary depending on the composition of combustion feed 45 and the conditions employed in combustion zone 10.

Combustion feed 45 is preferably preheated only at start-up of reactor 5 when combustion catalyst bed 12 is not ignited. The preheating of combustion feed 45 is preferably terminated once combustion catalyst bed 12 is ignited; but combustion feed 45 may be continuously preheated, for example to vaporize a fuel component that is liquid at ambient temperature and at the pressure of feed combustion feed 45. In an alternative embodiment, combustion feed 45 is preheated to temperatures from about 10° C. to about 30° C. in instances when the ambient temperature is below about 10° C.

In an embodiment, a preheater 50 can preheat combustion feed 45 before being fed to combustion zone 10. In instances when combustion catalyst bed 12 is ignited, combustion feed 45 can be fed to combustion zone 10 while preheater 50 is turned off or without heat input from preheater 50. Preheater 50 can supply heat to combustion feed 45 from any heat source that is capable of imparting heat to combustion feed 45. For instance, preheater 50 can be a furnace, electric heating element, and the like. Preheater 50 preferably does not include a burner or a flame. Preheater 50 may comprise a heat-exchanger device, wherein a hot stream, such as steam, a hot gas or a hot liquid, can transfer some heat to either combustion feed 45 or to one of its feedstocks passing through said heat-exchanger device. A sufficient amount of heat from preheater 50 is imparted to either or both of the feedstocks (i.e., fuel and $O_2$ sources) or to combustion feed 45 (comprising said fuel and $O_2$-containing gas) so as to cause ignition of combustion catalyst bed 12. To ignite combustion catalyst bed 12, combustion feed 50 preferably has a temperature between about 100° C. and about 500° C. and in other instances a temperature between about 100° C. and about 300° C. Once combustion catalyst bed 12 is ignited, combustion feed 45 can be fed to combustion zone 10 without being pre-heated or without its feedstocks, i.e., the fuel or the oxygen-containing gas, being individually preheated. This can be accomplished by either bypassing preheater 50 or turning off preheater 50 so that no additional heat is imparted to combustion feed 45 before entering the ignited combustion zone 10. The temperature of combustion feed 45 after ignition of combustion catalyst bed 12 may be the same as before ignition of combustion catalyst bed 12, or preferably is lower than the preheat temperature before ignition of bed 12. After ignition of combustion catalyst bed 12, combustion feed 45 may have a temperature between about ambient temperature and about 300° C., and in other instances a temperature between about ambient temperature and about 200° C., and in other embodiments, a temperature between about 20° C. and about 150° C. In some embodiments, the temperature of combustion feed 45 after ignition of combustion catalyst bed 12 is less than about 100° C. In an alternate embodiment, combustion feed 45 is at about ambient temperature after ignition of combustion catalyst bed 12. In preferred embodiments, combustion feed 45 is fed at a pressure slightly above or about the same as the pressure employed in combustion zone 10.

In some embodiments when the combustion catalyst bed 12 is ignited, combustion feed 45 is fed to reactor 5 via at least one inlet 14 at about ambient temperature but at a super atmospheric pressure, preferably of at least about 4 atm (about 400 kPa), more preferably at least about 7 atm (about 700 kPa).

Combustion zone 10 can operate at any conditions sufficient for the complete or incomplete combustion of the fuel comprised in combustion feed 45. For instance, combustion zone 10 can operate at a pressure of 10 psig or more (i.e., greater than 1.7 atm), preferably at pressures of about 15 psig or more (i.e., greater than 2 atm), more preferably at pressures of about 45 psig or more (i.e., greater than 4 atm), more preferably at about 90 psig or more (i.e., greater than 7 atm), and still more preferably between about 100 and about 600 psig (i.e., 7.8-42 atm). The gas hourly space velocity (GHSV) of combustion zone 10 can be from about 10,000 $hr^{-1}$ to about 1,000,000 $hr^{-1}$, and preferably from about 10,000 $hr^{-1}$ to about 100,000 $hr^{-1}$. In addition, the gas phase temperature in combustion zone 10 can be from about 200° C. to about 2,000° C., preferably from about 200° C. to about 1,000° C., more preferably from about 300° C. to about 900° C., still more preferably from about 300° C. to about 800° C., and most preferably from about 500° C. to about 800° C.

Combustion feed 45, optionally preheated by unit 50 before entry into reactor 5, is passed through combustion catalyst bed 12 under conversion promoting conditions so as to react some of the fuel with $O_2$ to generate heat and form combustion zone effluent 55 comprising $H_2O$ and/or $CO_2$. Combustion zone effluent 55 can also comprise carbon monoxide and/or hydrogen. In some embodiments, combustion zone effluent 55 further comprises unconverted fuel. In other embodiments, combustion zone effluent 55 further comprises unconverted $O_2$. In some embodiments, combustion zone effluent 55 comprises a very small amount of $O_2$ (e.g. between about 1,000 ppm $O_2$ and about 5,000 ppm $O_2$). In alternate embodiments, combustion zone effluent 55 comprises less than about 1,000 ppm $O_2$, preferably less than about 500 ppm $O_2$, more preferably less than about 100 ppm $O_2$. In some embodiments, combustion zone effluent 55 comprises between about 0 and about 100 ppm $O_2$. Combustion zone 10 can have any amount of combustion, such that the fuel may not be completely reacted with the $O_2$ present or that the $O_2$ may not completely react with the fuel present. In preferred embodiments, a complete conversion of oxygen is carried out in combustion catalyst bed 12, so that substantially all of the $O_2$ fed to the combustion zone 10 is consumed in combustion catalyst bed 12 (i.e., more than 99% of $O_2$ conversion, preferably more than 99.5% of $O_2$ conversion).

Combustion zone effluent 55 further comprises heat generated in combustion catalyst bed 12. The temperature of combustion zone effluent 55 exiting combustion zone 10 may be at least about 300° C. In some embodiments, combustion zone effluent 55 has a temperature ranging from about 300° C. to about 1,600° C., preferably at temperatures from about 300° C. to about 1,000° C., more preferably at temperatures from about 300° C. to about 900° C., still more preferably at temperatures from about 300° C. to about 800° C. The temperature of combustion zone effluent 55 is controlled primarily by the amount of $O_2$ fed to combustion catalyst bed 12. More specifically, the temperature of combustion zone effluent 55 may be controlled by performing the following steps: 1) measuring the temperature of combustion zone effluent 55; 2) comparing the measured temperature of combustion zone effluent 55 to a gas temperature target, for example between about 300° C. and about 1,000° C.; and 3) adjusting to the $O_2$ content or the fuel content of the combustion feed 45 feeding combustion zone 10 so that the amount of oxygen or fuel delivered is suitable to obtaining a gas effluent temperature approaching or equal to the gas temperature target. For example, adjusting the $O_2$ content in combustion feed 45 in order to reach the gas temperature target of the combustion zone effluent 55 can be accomplished by adjusting the flow rate of an $O_2$-containing feedstock employed to form combustion feed 45. For example, if the measured temperature of combustion zone effluent 55 is lower than the gas temperature target, the amount of $O_2$ fed to combustion zone 10 may be increased by increasing the $O_2$ content in combustion feed 45. Conversely, if the measured gas effluent temperature is higher than the gas temperature target for the gas effluent, the amount of $O_2$ fed to combustion zone 10 may be decreased by decreasing the $O_2$ content in combustion feed 45. In other embodiments, if the measured temperature of combustion zone effluent 55 is lower than the gas temperature target, the fuel:$O_2$ molar ratio of combustion feed 45 may be decreased by increasing the $O_2$ content or decreasing the fuel content in combustion feed 45. In some embodiments, the exit temperature of combustion zone effluent 55 can be optimized to achieve or approach a desirable gas temperature range while maintaining complete conversion of $O_2$ by keeping the fuel:$O_2$ molar ratio of combustion feed 45 equal to or greater than the stoichiometric fuel:$O_2$ ratio for combustion of said fuel.

Reaction feed 60 is fed to reactor 5 by injection to inter-bed zone 58, which is located inside reactor 5 and between combustion zone 10 and syngas production zone 15. Reaction feed 60 is fed to inter-bed zone 58 in a manner sufficient to cause reaction feed 60 to mix with combustion zone effluent 55. The mixing preferably takes place in a region of inter-bed zone 58, i.e., feed mix region 65. The mixing of combustion zone effluent 55 and reaction feed 60 in inter-bed zone 58 generates syngas feed 70. Reactor 5 comprises at least one inlet 68 suitable for introducing reaction feed 60 to reactor 5. Reaction feed 60 can be fed to reactor 5 through more than one inlet 68. Inlet 68 is preferably connected to inter-bed zone 58 to allow passage of reaction feed 60 to inter-bed zone 58. Reaction feed 60 can be fed to reactor 5 at any suitable temperature, preferably below its auto ignition temperature, more preferably at least 50° C. below its auto ignition temperature, still more preferably at least 100° C. below its auto ignition temperature. In preferred embodiments, reaction feed 60 is fed to reactor 5 at a temperature between about ambient temperature and about 300° C. In more preferred embodiments, reaction feed 60 is fed to reactor 5 at about ambient temperature. In an alternative embodiment, reaction feed 60 is preheated to temperatures from about 10° C. to about 30° C. in instances when the ambient temperature is below about 10° C. In preferred embodiments, whether the syngas catalyst bed 30 is ignited or not, reaction feed 60 is fed to reactor 5 at about ambient temperature. In some embodiments when syngas catalyst bed 30 is not ignited, reaction feed 60 may be preheated before entering reactor 5 at a temperature between about 300° C. and about 600° C. Once syngas catalyst bed 30 is ignited, reaction feed 60 is no longer preheated before its entry into reactor 5. If an ex-situ preheating of reaction feed 60 (i.e., outside of reactor 5) is performed before reaction feed 60 enters reactor 5, this ex-situ preheating of reaction feed 60 is preferably a transient step that may be used for the start-up of reactor 5. In some embodiments once the syngas catalyst bed 30 is ignited, reaction feed 60 is fed to reactor 5 via at least one inlet 68 at ambient temperature.

In some embodiments, at the start-up of reactor 5, combustion feed 45 is preheated and fed to reactor 5 via reactor inlet 14. The preheated combustion feed 45 flows through the combustion catalyst bed 12 to achieve ignition and initiate the combustion reaction in combustion catalyst bed 12. Combustion zone effluent 55 carrying heat generated by the combustion reaction in combustion catalyst bed 12 exits combustion zone 10 and directly flows through inter-bed zone 58 and subsequently through syngas production zone 15 comprising syngas catalyst bed 30, wherein some of the combustion heat is transferred to syngas catalyst bed 30. The $O_2$ content of combustion feed 45 can be adjusted to control the amount of heat generated in combustion catalyst bed 12 so as to achieve a temperature of syngas feed 70 entering syngas catalyst bed 30 sufficient to initiate the partial oxidation reaction in syngas catalyst bed 30. Once the reaction has initiated and syngas catalyst bed 30 is hot, the feeding of reaction feed 60 to reactor 5 via at least one inlet 68 into inter-bed zone 58 can be initiated so as to start the syngas production reaction in syngas catalyst bed 30. Alternatively, reaction feed 60 may be fed to reactor 5 while syngas catalyst bed 30 is being heated and initiated by heat of combustion transferred from combustion zone effluent 55.

In preferred embodiments of FIG. 1A, the temperature of combustion zone effluent 55 is sufficient to allow a sufficient amount of heat to be directly transferred from combustion zone effluent 55 to reaction feed 60 by mixing the two gas streams as reaction feed 60 enters inter-bed zone 58 of reactor 5. In this instance, the resulting mixture of combustion zone effluent 55 and reaction feed 60 (i.e., syngas feed 70) has a temperature upon entry of syngas catalyst bed 30 sufficiently high to ensure continuous operation and good performance of pre-ignited syngas catalyst bed 30. While not wishing to be bound by a particular theory, it is believed that the higher the temperature of syngas feed 70, the better the performance, i.e., productivity of syngas catalyst bed 30 in syngas production zone 15. Since the heating of reaction feed 60 is done in situ (i.e., inside reactor 5 by direct heat transfer), there is no need for preheating reaction feed 60 ex-situ before its entry into reactor 5 by the use of a pre-heater (such as fired heater or furnace), and the Applicants believe that this lack of ex-situ preheating should reduce the risk of pre-ignition of reaction feed 60 prior to its entry in reactor 5. The reduction or elimination of ex-situ preheat of reaction feed 60 should further allow the pressure of reaction feed 60 to be increased above atmospheric pressure (i.e., greater than 1 atm or 101 kPa), especially above about 4 atm (about 400 kPa), preferably above about 7 atm (about 700 kPa), more preferably above about 10 atm (about 1,000 kPa), still more preferably between about 10 atm (about 1,000 kPa) and about 40 atm (about 4,000 kPa).

The configuration of reactor 5 allows reaction feed 60 to be heated in-situ (i.e., inside reactor 5) by direct heat transfer from combustion zone effluent 55. The direct heat transfer is provided by mixing the two gas streams 60 and 55. Because most of the heat generated by combustion in combustion zone 10 is injected directly into reaction feed 60 by direct contact and mixing with the hot combustion zone effluent 55, there is no barrier to heat transfer (such as when using a heat exchanger device). While not wishing to be bound by a particular theory, it is believed that less fuel or energy is required in this system with in-situ heating of reaction feed 60 to reach the same temperature of the syngas feed 70 to the syngas production zone 15 than in a reactor system with ex-situ heating of a feed to a syngas production zone 15 by a heat exchanger device or a band heater or a furnace. In other words, the design of reactor 5 allows for a more efficient means of heat transfer. Moreover, the design of reactor 5 reduces the risk of premature ignition of reaction feed 60 before entry into reactor 5.

Reaction feed 60 can comprise one gaseous hydrocarbon or a mixture of gaseous hydrocarbons such as methane, ethane and methane mixtures, natural gas, or vaporized natural gas liquids. Reaction feed 60 also comprises an oxygen-containing source (i.e., $O_2$-containing gas). Reaction feed 60 preferably comprises an oxygen-containing gas and at least one light hydrocarbon such as methane or a mixture of light hydrocarbons such as natural gas. The oxygen-containing gas and the hydrocarbon or hydrocarbons can be present in any desired ratio. Without limitation, examples of suitable oxygen-containing gases include substantially pure oxygen ($O_2$); air; $O_2$-enriched air; $O_2$ diluted with a non-reactive gas such as nitrogen; any recycle stream or effluent stream from another unit, which may comprise a significant $O_2$ content, and which may have been sent through a separation unit in order to concentrate its $O_2$ content. Reaction feed 60 can have any carbon-to-oxygen (e.g., carbon in methane to molecular oxygen) ratio suitable for the syngas reaction. For example, reaction feed 60 can have a C-to-$O_2$ molar ratio from about 1.5:1 to about 3.3:1, or alternatively from about 1.7:1 to about 2.1:1, or alternatively from about 1.9:1 to about 2.05:1, or about 2:1. In alternative embodiments (not illustrated), the oxygen-containing gas is fed to inter-bed zone 58 either within or outside feed mix region 65, separately from reaction feed 60. For instance, reactor 5 can have multiple oxygen injection ports. Reaction feed 60 may comprise water or steam, CO and $CO_2$. In some embodiments, reaction feed 60 comprises steam. The steam-to-carbon molar ratio ($H_2O$:C) may be between about 0 and about 1:1, preferably between about 0 and about 0.5:1, more preferably between about 0.01:1 and about 0.25:1. In some embodiments, the $H_2O$:C molar ratio of reaction feed 60 is less than about 0.2:1. In preferred embodiments, reaction feed 60 is substantially free of steam or water. In some embodiments, no water or steam is added to reaction feed 60. Reaction feed 60 is preferably not preheated before being fed to reactor 5. In some embodiments, reaction feed 60 may comprise separate reactant gas feedstocks, i.e., an $O_2$-containing feedstock and a hydrocarbon gas feedstock comprising a light hydrocarbon such as methane or ethane, or mixtures thereof such as any methane/ethane mixture or natural gas. Preferably, the hydrocarbon gas feedstock is at least 80% methane, more preferably at least 90% methane; and the $O_2$-containing feedstock comprises at least 90% $O_2$, more preferably, is substantially pure oxygen gas (i.e., at least 98% $O_2$). The separate reactant gas feedstocks may be individually injected into inter-bed zone 58, and then mixed after injection within feed mix region 65. In preferred embodiments, reaction feed 60 comprises a mixture of reactant gas feedstocks, said reactant gas feedstocks being mixed before injection into inter-bed zone 58. Reaction feed 60 can be prepared by mixing the hydrocarbon gas feedstock and the $O_2$-containing feedstock together in a carbon:$O_2$ molar ratio of about 1.5:1 to about 3.3:1, preferably of about 1.7:1 to about 2.3:1, and more preferably of about 1.8:1 to about 2.1:1.

Reaction feed 60 can be fed to reactor 5 at a weight ratio of reaction feed 60 to combustion feed 45 of from about 3:1 to about 10:1. In other embodiments, reaction feed 60 can be fed to reactor 5 at a weight ratio of reaction feed 60 to combustion feed 45 of from about 3:1 to about 5:1.

Feed mix region 65 can be at any location within inter-bed zone 58 between combustion zone 10 and syngas production zone 15. Preferably, feed mix region 65 is at a suitable location between zones 10 and 15 to allow sufficient mixing of combustion zone effluent 55 and reaction feed 60 to form syngas feed 70 prior to being fed to syngas production zone 15. In some embodiments, feed mix region 65 is located between inlet 68 of reactor 5 (i.e., the entry point of reaction feed 60) and the upstream end of shield 35. In alternate embodiments, feed mix region 65 is located between inlet 68 of reactor 5 and the upstream end of syngas catalyst bed 30. The feed mix region 65 can be axially short. The height of feed mix region 65 (measured along a longitudinal axis of feed mix region 65) can comprise a longitudinal distance between inlet 68 and the upstream end of shield 35 between about 1 centimeter (cm) and 25 cm, preferably between about 2 cm and about 20 cm, and more preferably between about 3 cm and about 10 cm.

FIG. 1B illustrates an alternate embodiment of reactor 5, wherein reaction feed 60 may be distributed via a gas distributor 75, which is located in inter-bed zone 58. Gas distributor 75 is preferably disposed upstream of feed mix region 65. Optional gas distributor 75 may comprise inert packing (i.e., non reactive), one or more nozzles, one or more sparging units such as sparger rings, or other known gas distribution equipment. Optional gas distributor 75 may be capable of distributing premixed reactant gases or distributing separately reactant gases into inter-bed zone 58. The optional gas distributor may also be capable of distributing combustion zone effluent 55. In other embodiments in which reaction feed 60 comprises separate feedstocks, the separate feedstocks may be distributed into inter-bed zone 58 by different distributors (not illustrated). In some embodiments, the gas distributor 75 may be a pipe or ring having a specified number of gas injection points per cross-sectional area of inter-bed zone 58.

FIG. 1C illustrates an alternative embodiment of reactor 5 wherein feed mix region 65' comprises a packing refractory material. Feed mix region 65' may be either partially or totally filled with the packing refractory material. In some embodiments, the packing refractory material may serve as a gas distributor for syngas feed 70 before entering syngas production zone 15. Additionally or alternatively, the packing refractory material may serve as a heat shield to prevent radiated heat from syngas production zone 15 from increasing the temperature of the syngas feed 70 being formed in feed mix region 65' (so as to prevent syngas feed 70 from reaching its auto ignition temperature). In some embodiments, the packing refractory material only partially fills inter-bed zone 58 between zones 10 and 15, and the inlet 68 at which reaction feed 60 is injected into inter-bed zone 58 is located upstream of said packing refractory material, as illustrated in FIG. 1C. In some embodiments, the packing refractory material upstream of said syngas production zone 15 may lie on shield 35. In other embodiments, shield 35 is part of the feed mix region 65'.

The mixing efficiency of feed mix region 65 or 65' may be determined by the content of at least one component in the syngas feed 70 entering syngas production zone 15, which is a component of combustion zone effluent 55 or of reaction feed 60 or both (e.g., such as oxygen; content or hydrocarbon fuel or an non-reactive gas such as nitrogen). Alternatively, the mixing efficiency of feed mix region 65 or 65' may be determined by the molar ratio in syngas feed 70 of one component from the combustion zone effluent 55 to another component from reaction feed 60. For example, when the combustion zone effluent 55 comprises a carbonaceous fuel (e.g., methane) and the reaction feed 60 comprises methane and oxygen gas (i.e., $O_2$), the molar ratio of carbon-to-$O_2$ ($C:O_2$) of the gas present in feed mix region 65 may vary by not more than about 0.1:1 preferably by not more than about 0.08:1, more preferably by not more than about 0.05:1; still more preferably by not more than about 0.025:1 at various locations immediately upstream of syngas production zone 15. The mixing efficiency in feed mix region 65 can be estimated by 1) measuring the flow rate and the content of one component of reaction feed 60 not present in combustion zone effluent 55; 2) measuring the flow rate and the content of said component in combustion zone effluent 55; 3) measuring the content of said component in syngas feed 70 at different locations in an upstream section of syngas production zone 15 before entry into syngas catalyst bed 30 (e.g., top of shield 35 or between shield 35 and syngas catalyst bed 30), and 4) comparing the measured values to the expected value of said component in syngas feed 70 for perfect mixing.

Syngas feed 70 is generated by the mixing of combustion zone effluent 55 and reaction feed 60 so that syngas feed 70 comprises all the components of combustion zone effluent 55 and reaction zone feed 60. Syngas feed 70 can be fed to syngas production zone 15 at any conditions suitable for producing syngas. Syngas feed 70 may have a temperature equal to or greater than about 40° C. In some embodiments, syngas feed 70 has a temperature equal to or greater than about 100° C. In other embodiments, syngas feed 70 has a temperature equal to or greater than about 200° C.: In yet other embodiments, syngas feed 70 may have a temperature equal to or greater than about 300° C. In some embodiments, syngas feed 70 has a temperature between about 500° C. and about 1,600° C. In other embodiments, syngas feed 70 has a temperature between about 500° C. and about 1,200° C. Preferably, syngas feed 70 has a temperature from about 300° C. to about 800° C., more preferably from about 500° C. to about 800° C., still more preferably from about 500° C. to about 760° C. In addition, syngas feed 70 may have a pressure of at least about 2 atmospheres (>200 kPa). In some embodiments, syngas feed 70 is fed at a pressure from about 15 psig to about 600 psig (about 200-4,240 kPa). Preferably, syngas feed 70 is fed at a pressure from about 45 psig to about 600 psig (about 410-4,240 kPa), more preferably from about 100 psig to about 500 psig (about 790-3,550 kPa), still more preferably 120 psig to about 450 psig (about 930-3,200 kPa). In some embodiments, syngas feed 70 is fed at a pressure from about 45 psig to about 225 psig (about 410-1,650 kPa).

Syngas feed 70 is fed to syngas production zone 15 and is contacted with the catalyst in syngas catalyst bed 30 to produce syngas product 80. Syngas catalyst bed 30 can be operated at any conditions suitable for producing syngas by partial oxidation. The gas temperature in syngas catalyst bed 30 is preferably from about 600° C. to about 2,000° C., more preferably from about 600° C. to about 1,600° C., still more preferably from about 700° C. to about 1,200° C., most preferably from about 800° C. to about 1,100° C. In addition, syngas catalyst bed 30 can be operated at atmospheric or super-atmospheric pressure, preferably super-atmospheric. The pressure in syngas catalyst bed 30 can be from about from about 2 atm to about 40 atm (about 200-4,050 kPa), preferably from about 4 atm to about 40 atm (about 400-4,050 kPa), more preferably from about 7 atm to about 35 atm (about 700-3,550 kPa). In addition, syngas feed 70 can be passed over the syngas catalysts at any suitable space velocity for producing syngas. For instance, the gas hourly space velocity (GHSV) of syngas feed 70 can be from about 20,000 to about 100,000,000 $h^{-1}$, preferably from about 100,000 to about 25,000,000 $h^{-1}$; more preferably from about 800,000 to about 2,000,000 $h^{-1}$.

Under preferred catalytic partial oxidation promoting conditions with syngas feed 70 comprises methane ($CH_4$) and oxygen ($O_2$), at least 85% of $CH_4$ conversion and at least about 85% CO selectivity and 85% $H_2$ selectivity are achieved in syngas catalyst bed 30 at a pressure of at least 4 atmospheres of pressure, more preferably between about 4 atm and about 40 atm and a GHSV of at least about 100,000 $hr^{-1}$. In some embodiments when syngas feed 70 comprises methane ($CH_4$) and oxygen ($O_2$), at least 85% of $CH_4$ conversion and at least about 85% CO selectivity and 85% $H_2$ selectivity are achieved in zone 30 at a pressure of at least 7 atmospheres of pressure, more preferably between about 7 atm and about 15 atm and a GHSV of at least about 500,000 $hr^{-1}$, preferably at least 800,000 $hr^{-1}$.

In preferred embodiments, syngas feed 70 comprises one or more gaseous hydrocarbons, $O_2$, as well as $CO_2$ and water. Syngas feed 70 may further comprise unconverted fuel from combustion zone 10. Syngas feed 70 passes through syngas catalyst bed 30 under catalytic partial oxidation promoting conditions so that at least a portion of the one or more gaseous hydrocarbons reacts with $O_2$ in the presence of the catalyst in syngas catalyst bed 30 to form $H_2$ and CO. Syngas product 80 comprising said formed CO and $H_2$ exits reactor 5 via outlet 82.

It is to be understood that syngas can be produced by the catalytic partial oxidation ("CPOX") or direct partial oxidation of hydrocarbons (e.g., natural gas or methane or ethane or methane/ethane mixtures) to syngas. An example of catalytic partial oxidation of methane is shown in Equation 1. The by-products generated from the combustion reaction in combustion catalyst bed 12, which typically comprise $CO_2$ and water and are present in syngas feed 70, may also be converted in the syngas catalyst bed 30 to other compounds, such as $H_2$ and CO. For example, $CO_2$ can be converted to CO in syngas catalyst bed 30, and some of the $H_2O$ can be converted to hydrogen in syngas catalyst bed 30.

Examples of such conversions are shown in Equation 2 (steam reforming with methane) and Equation 3 (dry reforming with methane).

$$CH_4 + \tfrac{1}{2}O_2 \rightarrow CO + 2H_2 + \text{Heat Partial Oxidation} \quad (1)$$

$$CH_4 + H_2O + \text{Heat} \rightarrow CO + 3H_2 \text{ Steam Reforming} \quad (2)$$

$$CH_4 + CO_2 + \text{Heat} \rightarrow 2CO + 2H_2 \text{ Dry (or } CO_2\text{) Reforming} \quad (3)$$

These side reactions of the products of combustion zone 10 may change the $H_2/CO$ ratio of the syngas product 80 towards a desirable value. In some embodiments, the $H_2/CO$ ratio of the syngas product 80 may exceed about 2:1. Typically, the $H_2/CO$ ratio of a syngas product from a partial oxidation zone (catalytic or non-catalytic) which is fed with $O_2$ and natural gas or methane is between about 1.6:1 to about 1.95:1, which can be increased to a value equal to or greater than 2:1 by the addition of small amount of steam into the feed of said partial oxidation zone.

Syngas product 80 comprises hydrogen and carbon monoxide in any ratio. The molar ratio of hydrogen to carbon monoxide can be greater than about 0.5:1, from about 0.67:1 to about 2.5:1, greater than about 0.9:1, from about 1.4:1 to about 2.3:1, and from about 1.6:1 and about 2.2:1, or in other instances between about 2.0:1 and about 2.3:1. In some embodiments, the molar ratio of hydrogen to carbon monoxide of syngas product 80 is equal to or greater than 2:1. In some embodiments, syngas product 80 also comprises carbon dioxide. In other embodiments, syngas product 80 also comprises steam. In yet other embodiments, syngas product 80 also comprises carbon dioxide and steam. Syngas product 80 may have a $CO_2$ molar percent of less than about 5 wt. %. Syngas product 80 may have a $H_2O$ weight percent of less than about 10 wt. %.

Figure 2A:
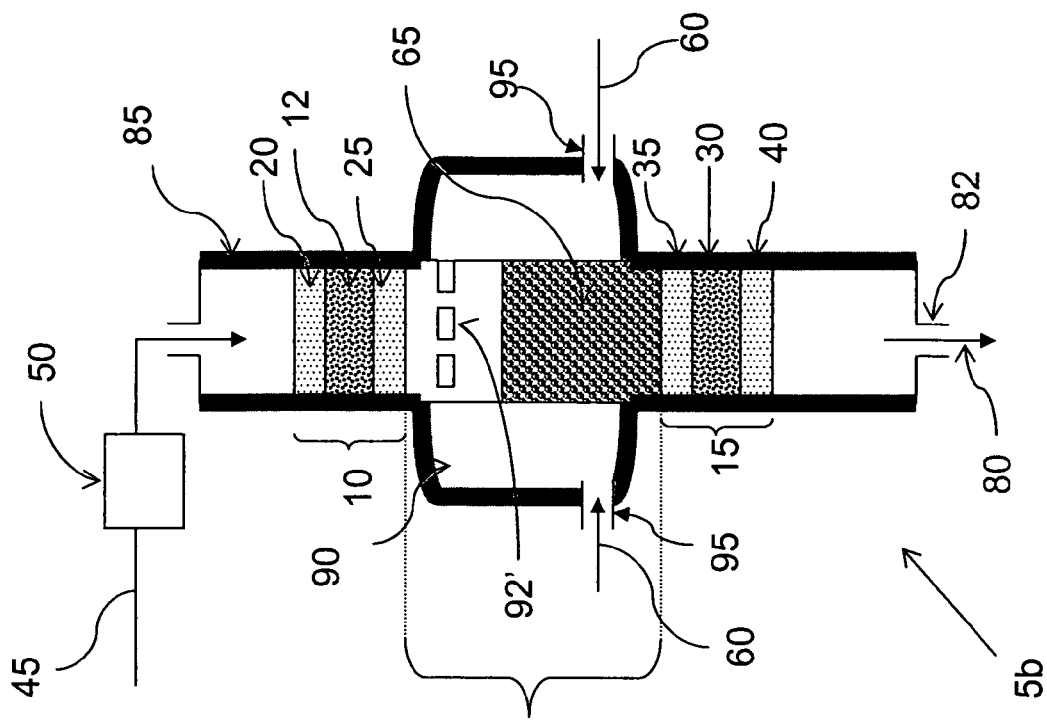
FIGS. 2A, 2B and 2C illustrate a syngas reactor comprising a shell housing two reaction zones with each zone comprising a catalyst and an inter-bed zone between said reaction zones and wherein the reactor further comprises an outer chamber surrounding at least a portion of said interbed zone.
Figure 2B:
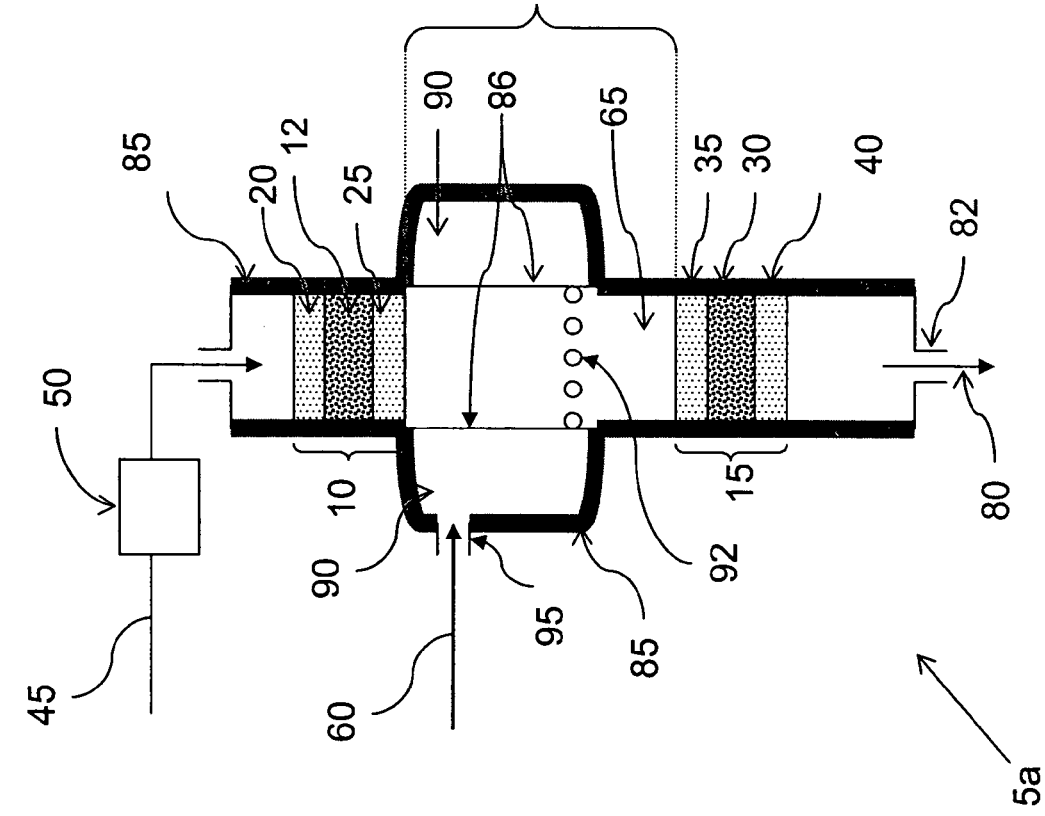

FIGS. 2A and 2B illustrate alternate embodiments of reactor systems (reactors 5a and 5b respectively) with a shell 85 that are similar to reactor 5 of FIGS. 1A-1C but comprise an outer chamber 90 surrounding at least a portion of the inter-bed zone 58 of the reactor. Reaction feed 60 is first fed to outer chamber 90 via chamber inlet 95 so that the outer chamber 90 is filled with reaction feed 60.

In FIG. 2A, reactor 5a comprises an outer shell 85 that is housing combustion zone 10 and syngas production zone 15. Shell 85 may be constructed of a structured metallic material (such as carbon steel or stainless steel). Shell 85 may not permit significant heat loss from reactor 5a and hence preferably comprises a refractory material so as to retain substantially all of the heat within reactor 5a. For this purpose, shell 85 may comprise a layer of insulation such as a ceramic fiber or ceramic foam material. The layer of insulation may be castable or pre-formed. The layer of insulation may be placed on the inside surface of shell 85, which will be exposed to the high temperature generated in both zones 10 and 15. In some embodiments, the layer of insulation comprises at least 60% alumina. In other embodiments, the layer of insulation comprises at least 90% alumina. Shell 85 further houses inter-bed zone 58 located between combustion zone 10 and syngas production zone 15.

Shell 85 further houses an outer chamber 90. In some embodiments, outer chamber 90 does not envelop combustion zone 10. In alternate embodiments, outer chamber 90 envelops at least a portion of combustion zone 10. In other embodiments, outer chamber 90 does not envelop syngas production zone 15. In preferred embodiments, outer chamber 90 does not envelop combustion zone 10 nor syngas production zone 15. In some embodiments, outer chamber 90 is not in thermal communication with combustion zone 10. In alternate embodiments, outer chamber 90 is not in thermal communication with syngas production zone 15. Outer chamber 90 preferably envelops at least a portion of the inter-bed zone 58.

Outer chamber 90 is preferably insulated so that substantially no heat escapes the system, and shell 85 preferably provides the insulation. Examples of suitable insulation include any refractory material, such as material comprising alumina, silica, zirconia, and the like.

Outer chamber 90 may be in thermal communication with said portion of the inter-bed zone 58 through an inner reactor wall 86. Inner reactor wall 86 provides a dividing element that separates inter-bed zone 58 and outer chamber 90. Inter-bed zone 58 is delimited by said inner reactor wall 86, combustion zone 10 (at downstream end of floor 25) and syngas production zone 15 (at upstream end of shield 35). The inner reactor wall 86 preferably allows or facilitates heat transfer between inter-bed zone 58 and outer chamber 90 and creates a zone of thermal contact between them. Inner reactor wall 86 can provide a heat-transfer means between inter-bed zone 58 and outer chamber 90, so as to facilitate heat transfer from inter-bed zone 58 to outer chamber 90. Inner reactor wall 86 may further allow fluid communication between inter-bed zone 58 and outer chamber 90. In some embodiments, inner reactor wall 86 comprises openings 92 through which the flow of gas from outer chamber 90 to inter-bed zone 58 is permitted. In some embodiments, some portion of inner reactor wall 86 may comprise a thermally-conductive non-permeable material that provides a mass transfer barrier and prevents fluid communication between inter-bed zone 58 and outer chamber 90. In other embodiments, inner reactor wall 86 or portion thereof may comprise a thermally-conductive permeable material, which allows heat transfer between inter-bed zone 58 and outer chamber 90, but also allows fluid communication between them (i.e., allows flow of gas from outer chamber 90 to inter-bed zone 58). Fluid communication between inter-bed zone 58 and outer chamber 90 may be provided by a porous material from which inner reactor wall 86 is constructed. When inner reactor wall 86 comprises a porous material, inner reactor wall 86 may not in some embodiments comprise openings 92, as the mass transfer from outer chamber 90 to inter-bed zone 58 can be made through the pores of the porous material comprised in inner reactor wall 86. The heated reaction feed 60 flowing through outer chamber 90 would pass from outer chamber 90 to inter-bed zone 58 through the pores of the porous material of inner reactor wall 86.

Figure 2C:
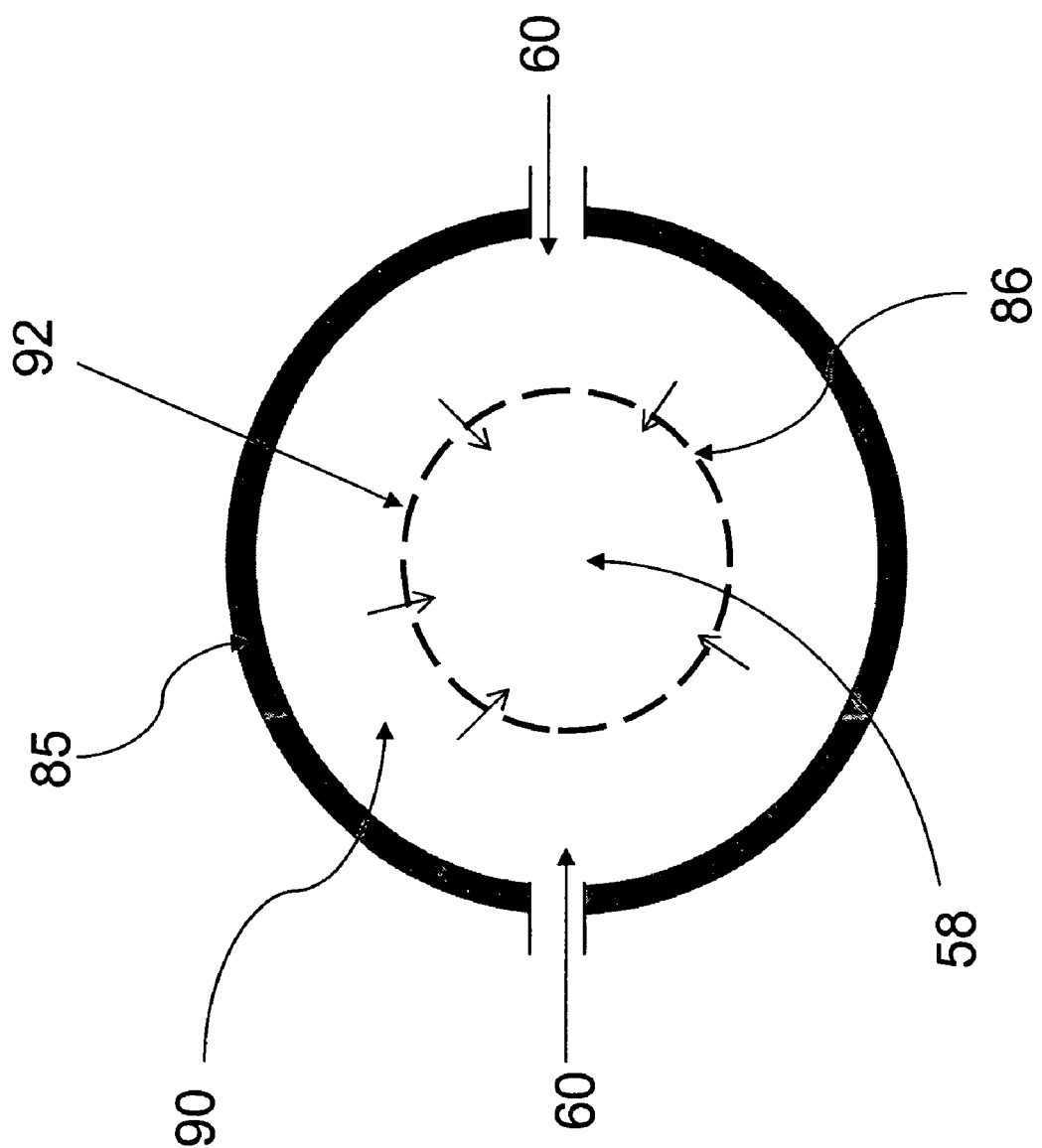

Preferably, fluid communication between inter-bed zone 58 and outer chamber 90 occurs via openings 92 of inner reactor wall 86 through which reaction feed 60 flows from outer chamber 90 to inter-bed zone 58. Openings 92 are preferably located along a circumference of inner reactor wall 86 of reactor 5a. Openings 92 are preferably equidistant from one another along a circumference of inner reactor wall 86 (as shown in FIG. 2C, which represents a cross-sectional view of outer chamber 90 enveloping inter-bed zone 58 of reactor 5a). However, openings 92 are not necessarily equidistant, or aligned on one circumference of inner reactor wall 86. Openings 92 could be disposed on more than one circumference of inner reactor wall 86. Uniform arrangement of openings 92 is preferred, but a non-uniform arrangement may yield satisfactory delivery of reaction feed 60 from outer chamber 90 to inter-bed zone 58. An example of a non-uniform arrangement would be the non-uniform distribution of pores in a porous material comprising inner reactor wall 86. Openings 92 serve as outlets for outer chamber 90 and reaction feed inlet for reactor 5a to allow the reaction feed 60 to pass from outer chamber 90 to inter-bed zone 58. Openings 92 of inner wall 86 may have various forms or shapes. In FIG. 2A, openings 92 are in the form of circular perforations. In FIG. 2B, openings 92' are in the form of rectangular or square slits. In FIG. 2C, openings 92 are in the form of equally spaced perforations. In other embodiments, openings 92 comprise pores or channels in a porous material such as in a ceramic foam.

The heat generated in combustion catalyst bed 12 exits combustion zone 10 via combustion zone effluent 55, which radiates the heat in inter-bed zone 58. Since at least a portion of inter-bed zone 58 is in thermal communication with outer chamber 90, some of the combustion heat is transferred to outer chamber 90, so that the gas phase inside outer chamber 90 gets heated. The use of outer chamber 90 allows the reaction feed 60 to be heated inside reactor 5 at a much longer dwell time than by solely upon contact and mixing with the combustion zone effluent 55 as is described in FIG. 1A. Outer chamber 90 can have any configuration suitable for allowing reaction feed 60 to be heated by combustion heat and to be fed to reactor 5 in the inter-bed zone 58 where it is mixed with combustion effluent 55 in feed mix region 65.

Chamber inlet 95 through which reaction feed 60 is fed to outer chamber 90 may be at any location between the downstream end of combustion floor 25 of combustion zone 10 and the upstream end of shield 35 of syngas production zone 15. In FIG. 2A, reaction feed 60 is fed to outer chamber 90 via inlet 95 located downstream of combustion zone 10 but closer to combustion zone 10 than to syngas production zone 15. In FIG. 2B, reaction feed 60 is fed to outer chamber 90 via two chamber inlets 95 located downstream of combustion zone 10 but closer to syngas production zone 15 than to combustion zone 10. Although one chamber inlet 95 is illustrated in FIG. 2A, more than one chamber inlet 95 may be used (as shown in FIG. 2B). FIG. 2B illustrates another embodiment of reactor 5a of FIG. 2A. Outer chamber 90 of reactor 5b has more than one chamber inlet 95, each chamber inlet 95 of which is adapted to feed a portion of reaction feed 60 into outer chamber 90. These chamber inlets 95 of reactor 5b are located at a different location than chamber inlet 95 of reactor 5a in FIG. 2A. In an alternative embodiment, chamber inlet 95 may be located downstream of feed mix region 65.

In FIGS. 2A-2C, there may be a pressure differential between outer chamber 90 and inter-bed zone 58 due to flow resistance through pores or openings 92 of inner reactor wall 86, wherein the pressure in outer chamber 90 is greater than the pressure in inter-bed zone 58. The pressure differential may be at least about 0.1 psi. In some embodiments, the pressure differential is at least about 1 psi. In alternate embodiments, the pressure differential is at least about 3 psi. In other embodiments, the pressure differential is greater than about 5 psi.

The following describes an exemplary application of the present invention as described in FIGS. 2A and 2B, which comprises substantially all of the elements of the above-discussed embodiments as illustrated in FIG. 1A and alternative embodiments thereof, with additional embodiments as discussed below. Combustion feed 45 is fed to combustion zone 10 and contacted with the combustion catalyst in combustion catalyst bed 12. In instances when combustion catalyst bed 12 has not been ignited, combustion feed 45 is preheated and fed to combustion zone 10. In instances once combustion catalyst bed 12 is ignited, combustion feed 45 can be fed to combustion zone 10 without being preheated. A sufficient amount of heat from feed preheater 50 is transferred to combustion feed 45 to pre-heat combustion feed 45 and ignite combustion catalyst bed 12. Once combustion catalyst bed 12 is ignited, combustion feed 45 can be fed to combustion zone 10 without being pre-heated. Combustion catalyst bed 12 can be diluted with a non-catalytic refractory material. In other embodiments, combustion catalyst bed 12 is not diluted.

In FIG. 2A, reaction feed 60 is fed via chamber inlet 95 to outer chamber 90 of reactor 5a, then flows (preferably in a downward manner) through outer chamber 90 and thereafter passes from outer chamber 90 to inter-bed zone 58 through openings 92 of inner wall 86 (in the form of circular holes).

In FIG. 2B, reaction feed 60 is fed via more than one chamber inlets 95 to outer chamber 90 of reactor 5b, then flows in a upward manner through outer chamber 90, and passes through openings 92 (in the form of rectangular slits) of inner wall 86 from outer chamber 90 to inter-bed zone 58.

In some alternate embodiments of FIGS. 2A-2B (not illustrated), reaction feed 60 may absorb heat from combustion zone 10 and/or combustion zone effluent 55, i.e., outer chamber 90 also surrounds at least a portion of combustion zone 10 so that some of the combustion heat may also be transferred through inner wall 86 (which extends up and envelops at least a portion of combustion zone 10 which is to be in thermal communication with chamber 90). The portion of inner reactor wall 86 enveloping the at least a portion of combustion zone 10 can provide a mass transfer barrier but allows heat transfer. For instance, in an embodiment wherein reaction feed 60 is fed to outer chamber 90 upstream of combustion zone 10 (not illustrated), reaction feed 60 can be in thermal contact with inner wall 86 comprising a thermal-conductive material and can absorb a portion of the heat generated by combustion zone 10 not only by convective heat transfer but also by radiated and conductive heat transfer prior to being fed to inter-bed zone 58.

Syngas feed 70 is formed by mixing the heated reaction feed 60 and the combustion zone effluent 55 in a portion of inter-bed zone 58, i.e., feed mix region 65. Syngas feed 70 then directly passes from feed mix region 65 to syngas production zone 15 where syngas feed 70 comes in contact with the syngas catalyst in syngas catalyst bed 30. At least a portion of syngas feed 70 gets converted to $H_2$ and CO and a syngas product 80 comprising $H_2$ and CO exits reactor 5a or 5b of FIGS. 2A and 2B, respectively.

It is to be understood that syngas product 80 can be used for any desirable application. For instance, it can be used as a feed stream in a Fischer-Tropsch process for producing higher molecular weight hydrocarbons. In such a process, syngas product 80 can be treated, scrubbed, stripped, compressed, cooled and/or passed through a separator in order to generate a suitable syngas feed to supply a hydrocarbon synthesis reactor.

In some embodiments for any of the FIGS. 1A-1C and 2A-2C, the hydrocarbon gas in reaction feed 60 comprises methane and the fuel in combustion feed 45 comprises any organic compounds with 1 to 5 carbon atoms or mixtures thereof as well as hydrogen gas. In other embodiments, the fuel in combustion feed 45 comprises ethane and the hydrocarbon gas in reaction feed 60 comprises methane. In alternate embodiments, the fuel in combustion feed 45 comprises natural gas while the hydrocarbon gas in reaction feed 60 comprises methane. In preferred embodiments, the fuel in combustion feed 45 and the hydrocarbon gas in reaction feed 60 both comprise methane. In other preferred embodiments, the fuel in combustion feed 45 comprises methane and $H_2$ while the hydrocarbon gas in reaction feed 60 comprises methane. In alternate preferred embodiments, the fuel in combustion feed 45 and the hydrocarbon gas in reaction feed 60 both comprise natural gas.

The reactor systems of FIGS. 1A-1C and 2A-2C may be constructed with one or more materials of construction that enable them to operate at super atmospheric pressure, preferably at pressures as high as 40 atm. Additionally, some of the materials of construction may be heat-resistant and can provide operation at temperatures above 1,000° C.

To further illustrate various illustrative embodiments of the present invention, the following examples are provided.

EXAMPLE

A reaction was carried out in a two-stage reactor similar to the one illustrated in FIG. 2A. The first stage comprised a combustion catalyst bed in which a small amount of methane was combusted (i.e., complete oxidation of methane to $CO_2$ and water). The test employed a quartz reactor with a length of 50 cm, an outside diameter of 16 mm and an inside diameter of 12 mm.

The combustion catalyst bed comprised a combustion catalyst, which included platinum deposited on ca. 1-mm alumina spheres (i.e., 1% Pt on $Al_2O_3$ spheres). The combustion catalyst bed was also diluted with ca. 1-mm alpha-alumina spheres with a dilution ratio of 10 part weight of $Al_2O_3$ spheres for each part by weight of combustion catalyst (Pt/$Al_2O_3$ spheres). Ceramic foam pieces of ca. 99% $Al_2O_3$ (12 mm outside diameter x 5 mm thick, with 80 pores per linear inch) were placed before and after the combustion catalyst bed as radiation shields. The inlet radiation shield also aided in uniform distribution of the combustion feed. A 600-watt band heater was placed around the quartz tube above the combustion bed, providing heat to light off the combustion reaction and preheat the combustion feed. The bottom edge of the band heater corresponded to the top of the radiation shield, which was located upstream of the combustion bed. The band heater was turned off when the combustion bed was ignited. A high temperature thermocouple was positioned axially about 10-12 mm below the bottom shield, and was used to indicate the temperature of the combustion effluent exiting the combustion catalyst bed.

The combustion feed comprised natural gas, $O_2$, $H_2$ and optionally nitrogen gas, as a diluent gas to the combustion bed (upstream stage or first stage). The combustion feed was initially heated up to 300° C. to ignite the combustion bed, but then the preheating was stopped after ignition. The temperature of the combustion feed was decreased to ambient temperature and remained at ambient temperature thereafter. The hydrogen gas was added to the combustion feed based upon the ratio of the addition of 0.1 moles of hydrogen being fundamentally equivalent to feeding 0.1 moles of superheated steam. It was expected that the hydrogen combustion took place in the combustion bed and formed water and heat. The natural gas-to-$O_2$ volumetric ratio being fed to the first stage was about 1.5:1 to 1.6:1. The $H_2$-to-$O_2$ volumetric ratio being fed to the first stage was about 0.4:1. The combustion feed to the first stage had a combined inlet flow rate of about 3,250-3,500 sccm (standard cubic centimeter per minute), to a gas hourly space velocity of about 100,000 $hr^{-1}$.

The combustion effluent from the first stage was passed into the second stage which comprised a partial oxidation catalytic bed. The partial oxidation catalytic bed comprised partial oxidation catalyst particles that included a catalytic material (rhodium and samarium) deposited on lanthanum-modified alumina spheres (i.e., 4 wt % rhodium, 4 wt % samarium on $La_2O_3$-modified alumina). Ceramic foam pieces of ca. 99% $Al_2O_3$ (12 mm outside diameter×5 mm thick, with 80 pores per linear inch) were placed before and after the partial oxidation catalyst bed as radiation shields.

In addition to the combustion stage effluent, a reaction feed comprising natural gas and oxygen gas ($O_2$) was fed to the partial oxidation catalytic bed (second stage) and was at room temperature (ca. 20° C.). The natural gas-to-$O_2$ volumetric ratio in the reaction feed being fed to the second stage was about 1.7:1 to 1.8:1. The reaction feed to the second stage had a total inlet flow rate of about 3,250-3,500 sccm (standard cubic centimeter per minute), to a gas hourly space velocity of about 100,000 $hr^{-1}$. The combined partial oxidation feed to the partial oxidation catalytic bed hence comprised oxygen gas, natural gas, and the effluent gas exiting the upstream combustion bed.

The space between the two catalytic zones (i.e., between combustion bottom shield and partial oxidation top shield) was filled with quartz rods of about 1 mm diameter and about 1 to 2 mm in length. The quartz rods helped for mixing the reaction feed and the combustion stage effluent to form the partial oxidation feed to the partial oxidation bed as well as for distribution of said partial oxidation feed before entering the downstream partial oxidation catalytic bed.

The runs were conducted with a combined inlet flow rate of about 7,000 sccm (standard cubic centimeter per minute), corresponding to a gas hourly space velocity of about 200,000 $hr^{-1}$ (calculated using the volumes of both catalyst beds) and at a pressure of 2-5 psig (121-136 kPa). The effluent exiting the partial oxidation bed was analyzed using a gas chromatograph equipped with a thermal conductivity detector. The data reported in Tables I and II were obtained after at least 2 hours on stream at the specified conditions.

Three runs were conducted with the run conditions noted in Table I below, and the results of the runs are listed in Table II below. All the flows listed in Table I are in standard cubic centimeter per minute (sccm).

TABLE I

Run Conditions

| | | Run Condition | | |
|---|---|---|---|---|
| | | 1 | 2 | 3 |
| | Total Flow (sccm) | 7,000 | 7,000 | 7,000 |
| Combustion Feed to 1st stage (combustion) | HC | 1,400 | 1,400 | 1,296 |
| | $O_2$ | 875 | 875 | 864 |
| | HC/$O_2$ molar ratio | 1.60 | 1.60 | 1.50 |
| | $H_2$ | 350 | 350 | 345 |
| | $N_2$ | 875 | 875 | 745 |
| Reaction Feed to 2nd stage (partial oxidation) | HC | 2,250 | 2,204 | 2,046 |
| | $O_2$ | 1,250 | 1,296 | 1,204 |
| | HC/$O_2$ molar ratio | 1.80 | 1.70 | 1.70 |
| | $N_2$ | 0 | 0 | 0 |

TABLE II

Results

| Run Condition | $CH_4$ Conversion (%) | CO Selectivity (%) | $CO_2$ Selectivity (%) | $H_2$/CO molar ratio at exit of 2nd stage | Mixed Feed Temp. entering 2nd stage (° C.) | Temp. at Exit of 2nd stage (° C.) |
|---|---|---|---|---|---|---|
| 1 | 91.3 | 90.1 | 9.9 | 2.2 | 724 | 1055 |
| 2 | 94.2 | 90.3 | 9.7 | 2.2 | 749 | 1058 |
| 3 | 95.2 | 89.9 | 10.1 | 2.2 | 762 | 1007 |

The runs demonstrated outstanding partial oxidation catalyst performance, considering that there was no preheat on its feed, other than from the heat of combustion from the first stage. In addition, the oxygen usage of the entire reactor system was low in view of the very good catalyst performance. When one considers that the combustion of the hydrogen added to the first stage immediately consumed a portion of the $O_2$ fed to the combustion bed, the effective oxygen:methane (i.e., $O_2$:$CH_4$) molar ratio entering the downstream catalytic partial oxidation bed was about 0.53:1-0.57:1.

The results also show that the $H_2$/CO ratio of the effluent exiting the catalytic partial oxidation bed was consistently above 2:1. In addition, the system enabled high inlet temperatures in the range of 724-762° C., which are higher than the inlet temperatures (generally between 100° C. and 700° C., more typically between 300° C. and 600° C.) for a catalytic partial oxidation system with a typical ex-situ preheat system.

Although the present invention and its advantages have been described in detail, it should be understood that various changes, substitutions, and alterations may be made herein without departing from the spirit and scope of the invention as defined by the appended claims.

What is claimed is:

1. A process for the production of synthesis gas from a feedstream comprising a hydrocarbon-containing gas and an oxygen-containing gas, comprising:
    (A) providing a reactor system comprising a shell that is housing an outer chamber, a first reaction zone, a second reaction zone, and an inter-bed zone, wherein the inter-bed zone is disposed between said first and second reaction zones, wherein the outer chamber envelops at least a portion of the inter-bed zone, and further wherein an inner reactor wall divides said outer chamber and said enveloped portion of the inter-bed zone, and allows fluid communication and heat transfer between said inter-bed zone and said outer chamber;
    (B) feeding a combustion feed to the first reaction zone comprising a combustion catalyst, wherein the combustion feed comprises oxygen and a fuel with a fuel-to-oxygen molar ratio equal to or greater than the stoichiometric fuel-to-oxygen molar ratio for combustion of said fuel;
    (C) contacting the combustion feed with the combustion catalyst under conditions sufficient to combust at least a portion of the fuel with more than 99% of $O_2$ conversion so as to generate combustion heat and form a combustion effluent which exits said first reaction zone and enters said inter-bed zone while carrying at least some of the combustion heat;
    (D) feeding a reaction feed comprising a hydrocarbon gas and oxygen to the outer chamber;
    (E) heating said reaction feed in said outer chamber with some of the combustion heat which is transferred from said inter-bed zone to said outer chamber;
    (F) passing said heated reaction feed from said outer chamber to said inter-bed zone through said inner reactor wall;
    (G) mixing the combustion effluent and the heated reaction feed downstream of the first reaction zone in a feed mix region of the inter-bed zone to form a syngas feed comprising said combustion effluent, oxygen, and said hydrocarbon gas;
    (H) feeding the syngas feed to the second reaction zone comprising a partial oxidation catalyst; and
    (I) contacting the syngas feed with the partial oxidation catalyst at conditions sufficient to partially oxidize the hydrocarbon gas to form a product stream comprising hydrogen and carbon monoxide.

2. A process for the production of synthesis gas from a feedstream comprising a hydrocarbon gas and oxygen, comprising:
    (A) providing a reactor system comprising a first reaction zone, a second reaction zone being in fluid communication with said first reaction zone, and an inter-bed zone disposed between the first and second reaction zones, wherein the first reaction zone is catalytic and comprises a combustion catalyst and the second reaction zone is catalytic and comprises a partial oxidation catalyst;
    (B) feeding a combustion feed comprising oxygen and a fuel to the first reaction zone, wherein the combustion feed is at super atmospheric pressure;
    (C) contacting the combustion feed with the combustion catalyst under conditions sufficient to combust at least a portion of the fuel so as to form a combustion effluent;
    (D) feeding a reaction feed comprising a hydrocarbon gas and oxygen to the inter-bed zone, wherein the reaction feed is at super atmospheric pressure, and further wherein said reaction feed is at about ambient temperature once said partial oxidation catalyst in said second reaction zone is ignited;
    (E) mixing the combustion effluent and the reaction feed in a feed mix region of said inter-bed zone to form a syngas feed comprising the combustion effluent, the hydrocarbon gas and oxygen;
    (F) feeding the syngas feed to the second reaction zone; and
    (G) contacting the syngas feed to the syngas catalyst at conditions sufficient to partially oxidize the hydrocarbon gas to generate a product stream comprising hydrogen and carbon monoxide.

3. The process of claim 2, wherein step (B) is accomplished without ex-situ pre-heating the combustion feed before feeding said combustion feed to the first reaction zone, once the combustion catalyst is ignited.

4. The process of claim 2, wherein the combustion catalyst comprises a catalytic component selected from the group consisting of chromium, cerium, lanthanum, samarium, cobalt, any oxide thereof, platinum, palladium, rhodium, ruthenium, iridium, osmium, and any combination of two or more thereof.

5. The process of claim 2, wherein the combustion catalyst comprises platinum, palladium, chromium, or any combination of two or more thereof.

6. The process of claim 2, wherein the combustion feed has a fuel-to-oxygen molar ratio from about 1:2 to about 10:1.

7. The process of claim 2, wherein the combustion feed has a fuel-to-oxygen molar ratio equal to or greater than the stoichiometric fuel-to-oxygen molar ratio for combustion of said fuel.

8. The process of claim 2, further comprising ex-situ preheating the combustion feed with sufficient amount of heat for ignition in the first reaction zone, and thereafter reducing or eliminating the ex-situ preheating of the combustion feed upon ignition.

9. The process of claim 8, wherein no heat is applied to the combustion feed upon or after ignition of the combustion catalyst.

10. The process of claim 2, wherein the combustion feed is at about ambient temperature once the combustion catalyst is ignited.

11. The process of claim 2, wherein the combustion effluent comprises a temperature between about 300° C. and about 1,600° C.

12. The process of claim 2, wherein the reaction feed comprises methane and oxygen.

13. The process of claim 2, wherein the process further comprises a weight ratio of the reaction feed to the combustion feed of from about 3:1 to about 10:1.

14. The process of claim 2, wherein the partial oxidation catalyst comprises a catalytic component selected from the group consisting of rhenium, nickel, cobalt, ruthenium, palladium, osmium, iridium, platinum, rhodium, any combination of nickel and magnesium oxide, any alloy of nickel and magnesium oxide, any combination of nickel and rhodium, any alloy of nickel and rhodium, and any combination of two or more components thereof.

15. The process of claim 2, wherein the partial oxidation catalyst comprises rhodium.

16. The process of claim 2, wherein the syngas feed is fed in step (F) to the second reaction zone at a temperature between about 300° C. and about 800° C.

17. The process of claim 2, wherein the conditions sufficient in step (G) comprise a gas temperature from about 600° C. to about 2,000° C.

18. The process of claim 2, wherein the conditions sufficient in step (G) comprise a gas temperature from about 800° C. to about 1,100° C.

19. The process of claim 2, wherein the product stream of step (G) comprises a molar ratio of hydrogen to carbon monoxide greater than about 1.9:1.

20. The process of claim 2, wherein the product stream of step (G) comprises a molar ratio of hydrogen to carbon monoxide between about 2.0:1 and about 2.3:1.

21. The process of claim 2, wherein the pressure of the combustion feed and the pressure of the reaction feed are greater than about 4 atm.

22. The process of claim 2, wherein the pressure of the combustion feed and the pressure of the reaction feed are greater than about 7 atm.

23. The process of claim 2 wherein the combustion effluent exiting the first reaction zone comprises less than about 1,000 ppm $O_2$.

24. The process of claim 2 wherein the fuel in said combustion feed comprises ethane, and the hydrocarbon gas in said reaction feed comprises methane.

25. The process of claim 2 wherein the fuel in said combustion feed comprises methane, and the hydrocarbon gas in said reaction feed comprises methane.

26. The process of claim 2 wherein the fuel in said combustion feed comprises hydrogen ($H_2$) and methane, and the hydrocarbon gas in said reaction feed comprises methane.

27. The process of claim 2 wherein said syngas feed comprises methane and $O_2$, and further wherein at least 85% of methane conversion, at least about 85% CO selectivity and at least about 85% $H_2$ selectivity are achieved in said second reaction zone operated at a pressure of at least 4 atmospheres and a gas hourly space velocity of at least about 100,000 $hr^{-1}$.

28. The process of claim 2 wherein said first reaction zone, said second reaction zone and said inter-bed zone are housed in a single shell.

29. The process of claim 2 wherein said first and second reaction zones comprise an exothermic reaction.

30. The process of claim 2 further comprising controlling the temperature of the combustion effluent by performing the following steps:
  measuring the temperature of the combustion effluent;
  comparing the measured temperature of the combustion effluent to a gas temperature target between about 300° C. and about 1,000° C.; and
  adjusting the oxygen content or the fuel content of the combustion feed which feeds the first reaction zone so that the content of oxygen or fuel in said combustion feed is suitable to obtaining a combustion effluent temperature approaching, or equal to, said gas temperature target.

31. The process of claim 2 wherein said first reaction zone does not contain a burner to ignite said combustion feed.

32. The process of claim 2 wherein said second reaction zone does not contain a burner to ignite said syngas feed.

33. The process of claim 2 wherein the combustion of the at least said portion of said fuel in step (C) is carried out with more than 99% of $O_2$ conversion.

34. The process of claim 2, further comprising ex-situ preheating said reaction feed before ignition in said second reaction zone, and thereafter eliminating the ex-situ preheating of said reaction feed upon or after ignition.

35. The process of claim 2, wherein said inter-bed zone further is at least partially filled with a packing material.

36. A process for the production of synthesis gas from a feedstream comprising a hydrocarbon-containing gas and an oxygen-containing gas, comprising:
  (A) providing a reactor system comprising a shell that is housing an outer chamber, a first reaction zone, a second reaction zone, and an inter-bed zone, wherein the inter-bed zone is disposed between said first and second reaction zones, and further wherein the outer chamber envelops at least a portion of the inter-bed zone;
  (B) feeding a combustion feed to the first reaction zone comprising a combustion catalyst, wherein the combustion feed comprises oxygen and a fuel;
  (C) contacting the combustion feed with the combustion catalyst under conditions sufficient to combust at least a portion of the fuel so as to form a combustion effluent which exits the first reaction zone;
  (D) feeding a reaction feed comprising a hydrocarbon gas and oxygen to the outer chamber, wherein the reaction feed is further passed from said outer chamber to the inter-bed zone through an inner reactor wall dividing said outer chamber and said enveloped portion of the inter-bed zone, said inner reactor wall allowing fluid communication and heat transfer between said inter-bed zone and said outer chamber;
  (E) mixing the combustion effluent and the reaction feed downstream of the first reaction zone in a feed mix region of the inter-bed zone to form a syngas feed comprising the combustion effluent, oxygen, and the hydrocarbon gas;
  (F) feeding the syngas feed to the second reaction zone comprising a partial oxidation catalyst; and
  (G) contacting the syngas feed with the partial oxidation catalyst at conditions sufficient to partially oxidize the hydrocarbon gas to form a product stream comprising hydrogen and carbon monoxide.

37. The process of claim 36, wherein step (B) is accomplished without ex-situ pre-heating the combustion feed.

38. The process of claim 36, wherein the combustion catalyst comprises platinum, palladium, chromium, or any combination thereof.

39. The process of claim 36, wherein the combustion feed has a fuel-to-oxygen molar ratio equal to or greater than the stoichiometric fuel-to-oxygen molar ratio for combustion of said fuel.

40. The process of claim 36, wherein the combustion feed has a fuel-to-oxygen molar ratio from about 1:2 to about 10:1.

41. The process of claim 36, wherein a sufficient amount of heat is added to the combustion feed to ignite the first reaction zone, and wherein less amount of heat or no heat is provided to the combustion feed upon ignition.

42. The process of claim 41, wherein no heat is applied to the combustion feed upon ignition.

43. The process of claim 36, wherein the combustion feed is at about ambient temperature once the combustion catalyst is ignited.

44. The process of claim 36, wherein no heat is applied to the reaction feed upon or after ignition of the partial oxidation catalyst.

45. The process of claim 36, wherein the reaction feed is at about ambient temperature once the partial oxidation catalyst is ignited.

46. The process of claim 36, wherein the combustion effluent comprises a temperature between about 300° C. and about 1,600° C.

47. The process of claim 36, wherein the reaction feed comprises methane and oxygen.

48. The process of claim 36, wherein the process further comprises a weight ratio of the reaction feed to the combustion feed of from about 3:1 to about 10:1.

49. The process of claim 36, wherein the inner reactor wall comprises openings or pores adapted to pass the reaction feed therethrough from the outer chamber to the inter-bed zone.

50. The process of claim 36, wherein at least a part of the outer chamber is in thermal communication and fluid communication with the inter-bed zone.

51. The process of claim 36, wherein the outer chamber further envelops at least a portion of the first reaction zone so as to be in thermal communication with the first reaction zone.

52. The process of claim 36, wherein the partial oxidation catalyst comprises a catalytic component selected from the group consisting of rhenium, nickel, cobalt, ruthenium, palladium, osmium, iridium, platinum, rhodium, any combination of nickel and magnesium oxide, any alloy of nickel and magnesium oxide, any combination of nickel and rhodium, any alloy of nickel and rhodium, and any combination of two or more components thereof.

53. The process of claim 36, wherein the partial oxidation catalyst comprises rhodium.

54. The process of claim 36, wherein the syngas feed fed in step (F) to the second reaction zone has a temperature equal to or greater than about 40° C.

55. The process of claim 54, wherein the syngas feed fed in step (F) to the second reaction zone has a temperature between about 300° C. and about 800° C.

56. The process of claim 36, wherein the product stream of step (G) comprises a molar ratio of hydrogen to carbon monoxide greater than about 2.1:1.

57. The process of claim 36, wherein the product stream of step (G) comprises a molar ratio of hydrogen to carbon monoxide between about 2.0:1 and 2.3:1.

58. The process of claim 36, wherein the pressure of the combustion feed and the pressure of the reaction feed are greater than about 4 atm.

59. The process of claim 36, wherein the pressure of the combustion feed and the pressure of the reaction feed are greater than about 7 atm.

60. The process of claim 36 wherein the combustion effluent exiting the first reaction zone comprises less than about 1,000 ppm $O_2$.

61. The process of claim 36 wherein the fuel in said combustion feed comprises ethane, and the hydrocarbon gas in said reaction feed comprises methane.

62. The process of claim 36 wherein the fuel in said combustion feed comprises methane, and the hydrocarbon gas in said reaction feed comprises methane.

63. The process of claim 36 wherein the fuel in said combustion feed comprises hydrogen ($H_2$) and methane, and the hydrocarbon gas in said reaction feed comprises methane.

64. The process of claim 36 wherein said first and second reaction zones comprise an exothermic reaction.

* * * * *

UNITED STATES PATENT AND TRADEMARK OFFICE
CERTIFICATE OF CORRECTION

PATENT NO. : 7,381,230 B2
APPLICATION NO. : 11/026480
DATED : June 3, 2008
INVENTOR(S) : C. Robert Rapier and James A. McMahon It is certified that error appears in the above-identified patent and that said Letters Patent is hereby corrected as shown below:

Column 4, line 59, please delete "02" and insert --$O_2$--

Column 7, line 27, please delete duplicate wording "from about"

Column 9, line 58, please delete duplicate wording "neodymium"

Column 10, line 22, please delete duplicate wording "from about"

Column 22, line 12, please delete "Sa" and insert --5a--

Signed and Sealed this

Fourth Day of November, 2008

JON W. DUDAS
*Director of the United States Patent and Trademark Office*